United States Patent
Sang et al.

(10) Patent No.: US 11,864,014 B2
(45) Date of Patent: Jan. 2, 2024

(54) SYSTEM AND METHOD FOR SUPPORTING MEASUREMENTS AND MOBILITY IN A WIRELESS COMMUNICATIONS SYSTEM

(71) Applicant: Huawei Technologies Co., Ltd., Shenzhen (CN)

(72) Inventors: Aimin Justin Sang, Mountain View, CA (US); Jialin Zou, Randolph, NJ (US); Mazin Ali Al-Shalash, Frisco, TX (US); Xuelong Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 525 days.

(21) Appl. No.: 17/112,584

(22) Filed: Dec. 4, 2020

(65) Prior Publication Data
US 2021/0176656 A1   Jun. 10, 2021

Related U.S. Application Data

(63) Continuation of application No. PCT/CN2019/075135, filed on Feb. 15, 2019.

(60) Provisional application No. 62/803,086, filed on Feb. 8, 2019, provisional application No. 62/681,488, filed on Jun. 6, 2018.

(51) Int. Cl.
*H04W 24/10* (2009.01)
*H04W 36/08* (2009.01)
*H04W 48/20* (2009.01)

(52) U.S. Cl.
CPC ............ *H04W 24/10* (2013.01); *H04W 36/08* (2013.01); *H04W 48/20* (2013.01)

(58) Field of Classification Search
CPC ...... H04W 24/10; H04W 36/08; H04W 48/20
See application file for complete search history.

(56) References Cited

U.S. PATENT DOCUMENTS

| | | | |
|---|---|---|---|
| 2014/0301287 A1 | 10/2014 | Frenne et al. | |
| 2017/0366996 A1* | 12/2017 | Park | H04W 24/10 |
| 2018/0048413 A1 | 2/2018 | Liu et al. | |
| 2019/0260544 A1 | 8/2019 | Dou et al. | |
| 2021/0204231 A1* | 7/2021 | Harada | H04L 5/001 |

FOREIGN PATENT DOCUMENTS

| | | |
|---|---|---|
| CN | 102057591 A | 5/2011 |
| CN | 103703834 A | 4/2014 |
| CN | 104956714 A | 9/2015 |
| CN | 108024364 A | 5/2018 |
| WO | 2013184613 A2 | 12/2013 |
| WO | 2018085145 A1 | 5/2018 |
| WO | 2019233119 A1 | 12/2019 |

OTHER PUBLICATIONS

Interdigital, Inc., "BWP switching triggering CSI report and cross BWP scheduling", 3GPP TSG RAN WG1 Meeting #92, R1-1802572, Feb. 26-Mar. 2, 2018, 4 pages, Athens, Greece.

* cited by examiner

*Primary Examiner* — Brian P Cox
(74) *Attorney, Agent, or Firm* — Slater Matsil, LLP

(57) ABSTRACT

A method for mobility management implemented by a user equipment (UE) includes measuring a reference signal thereby producing mobility measurements for a mobility procedure, wherein the reference signal is associated with one of a cell or a bandwidth part (BWP), and scaling the mobility measurements in accordance with at least one BWP parameter.

20 Claims, 14 Drawing Sheets

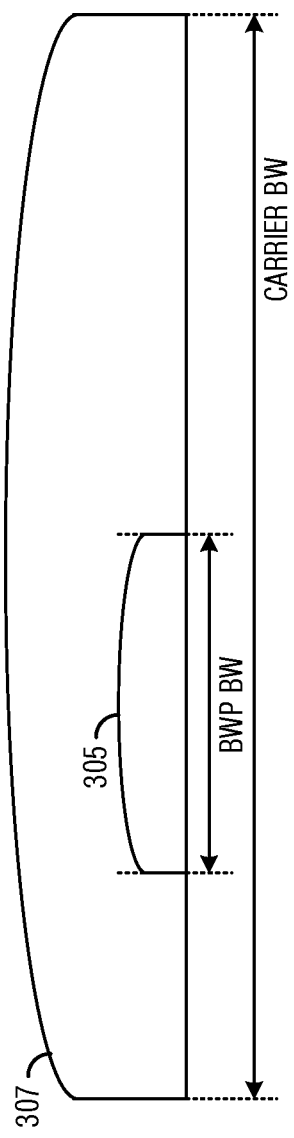
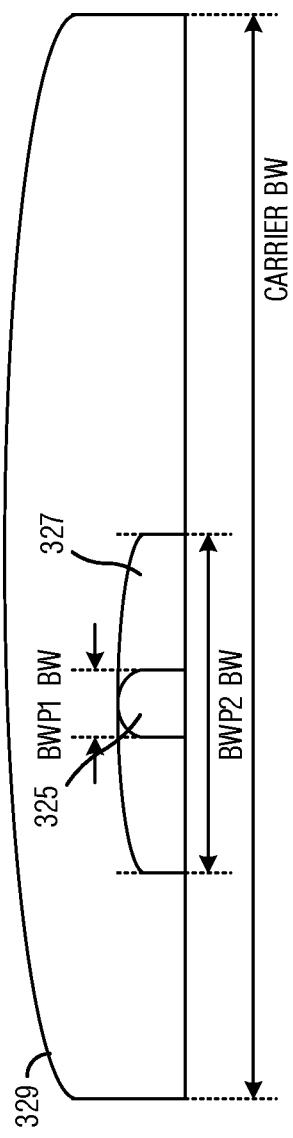

SYSTEM AND METHOD FOR SUPPORTING MEASUREMENTS AND MOBILITY IN A WIRELESS COMMUNICATIONS SYSTEM

This application is a continuation of PCT Application PCT/CN2019/075135 filed on Feb. 15, 2019 and entitled "System and Method for Supporting Measurements and Mobility in a Wireless Communications System," which claims the benefit of U.S. Provisional Application No. 62/681,488, filed on Jun. 6, 2018, entitled "System and Method for Supporting Measurements and Mobility in a Wireless Communications System," and U.S. Provisional Application No. 62/803,086, filed on Feb. 8, 2019, entitled "System and Method for Supporting Measurements and Mobility in a Wireless Communications System," all of which applications are hereby incorporated herein by reference in their entireties.

TECHNICAL FIELD

The present disclosure relates generally to a system and method for digital communications, and, in particular embodiments, to a system and method for supporting measurements and mobility in a wireless communications system.

BACKGROUND

Communications system designers continue to add new mechanisms to communications systems to support larger numbers of users and to meet the ever increasing demand for greater data rates. Device mobility is an important feature to support in modern wireless communications systems because it allows users to continue receiving service as the users move about a wireless communications system. Therefore, there is a need for systems and methods for supporting measurements and mobility in a wireless communications system.

SUMMARY

According to a first aspect, a method for mobility management implemented by a user equipment (UE) is provided. The method includes measuring, by the UE, a reference signal thereby producing mobility measurements for a mobility procedure, wherein the reference signal is associated with one of a cell or a bandwidth part (BWP), and scaling, by the UE, the mobility measurements in accordance with at least one BWP parameter.

In a first implementation form of the method according to the first aspect as such, further comprising reporting, by the UE, at least one of the mobility measurements or the scaled mobility measurements, and receiving, by the UE, a mobility decision determined based on the report.

In a second implementation form of the method according to the first aspect as such or any preceding implementation form of the first aspect, further comprising determining, by the UE, that a BWP-specific reference signal associated with the BWP is available, and based thereon, measuring, by the UE, the BWP-specific reference signal thereby producing BWP-specific mobility measurements, and determining, by the UE, that the BWP-specific reference signal needs scaling, and based thereon, scaling, by the UE, the BWP-specific mobility measurements thereby producing scaled BWP-specific mobility measurements.

In a third implementation form of the method according to the first aspect as such or any preceding implementation form of the first aspect, further comprising determining, by the UE, that the BWP-specific reference signal is available, and based thereon, reporting, by the UE, the BWP-specific mobility measurements, and receiving, by the UE, a BWP-level mobility decision based on the reports.

In a fourth implementation form of the method according to the first aspect as such or any preceding implementation form of the first aspect, wherein mobility measurements comprise cell-specific mobility measurements and BWP-specific mobility measurements, and wherein the method further comprises reporting, by the UE, at least one of the cell-specific mobility measurements or the BWP-specific mobility measurements, and receiving, by the UE, a harmonized mobility decision based on the report.

In a fifth implementation form of the method according to the first aspect as such or any preceding implementation form of the first aspect, wherein mobility measurements comprises cell-specific mobility measurements and BWP-specific mobility measurements, and wherein the method further comprises combining, by the UE, scaled cell-level mobility measurements and BWP-level mobility measurements, thereby producing a combined measurement, and determining, by the UE, a harmonized mobility decision in accordance with the combined measurement.

In a sixth implementation form of the method according to the first aspect as such or any preceding implementation form of the first aspect, further comprising determining, by the UE, a cell-level mobility decision in accordance with the mobility measurements, and determining, by the UE, that a BWP configuration of the BWP is available, and based thereon, refining, by the UE, the cell-level mobility decision in accordance with the scaled mobility measurements wherein the scaling is performed by applying the BWP-specific parameters to the measurements, and reporting, by the UE, the refined cell-level mobility decision.

In another implementation form of the method according to the first aspect as such or any preceding implementation form of the first aspect, further comprising receiving, by the UE, a BWP-level configuration and based thereon, scaling, by the UE, the mobility measurements with the BWP configuration parameters, and reporting, by the UE, the scaled mobility measurements.

In a seventh implementation form of the method according to the first aspect as such or any preceding implementation form of the first aspect, further comprising determining, by the UE, that a BWP-specific reference signal is available, and based thereon, measuring, by the UE, the BWP-specific reference signal, thereby producing BWP-level mobility measurements, and determining, by the UE, a BWP-level mobility decision in accordance with the BWP-level mobility measurements.

In an eighth implementation form of the method according to the first aspect as such or any preceding implementation form of the first aspect, further comprising determining that the BWP configuration of the BWP is available, and based thereon scaling, by the UE, the BWP-level mobility measurements in accordance with parameters of the BWP configuration, determining, a refined BWP-level mobility decision based on the scaled BWP-level mobility measurements, and reporting, by the UE, at least one of the scaled BWP-level mobility measurements or the refined BWP-level mobility decision.

In a ninth implementation form of the method according to the first aspect as such or any preceding implementation form of the first aspect, further comprising determining that the BWP-specific reference signal is available, and based thereon determining, by the UE, a refined cell-level mobility decision in accordance with at least one of a scaled cell-specific mobility measurement, the BWP-level mobility decision, or the BWP-level mobility measurements, and performing, by the UE, a cell-level mobility process based on the refined cell-level mobility decision.

In another implementation form of the method according to the first aspect as such or any preceding implementation form of the first aspect, further comprising scaling the measurements with configured BWP-specific parameters and applying the scaled measurements, by the UE, to refine a BWP-level mobility decision.

In another implementation form of the method according to the first aspect as such or any preceding implementation form of the first aspect, further comprising scaling the measurements with configured BWP-specific parameters and applying the scaled measurements, by the UE, to refine a cell-level mobility decision, In a tenth implementation form of the method according to the first aspect as such or any preceding implementation form of the first aspect, wherein determining the refined cell-level mobility decision comprises combining, by the UE, the cell-level mobility decision, the BWP-level mobility measurements, and the BWP-level mobility decision.

In an eleventh implementation form of the method according to the first aspect as such or any preceding implementation form of the first aspect, wherein combining the refined cell-level mobility decision, the BWP-level mobility measurements, and the BWP-level mobility decision comprises at least one of selectively combining, iteratively combining, recurrently combining, or sequentially combining the refined cell-level mobility decision, the BWP-level mobility measurements, and the BWP-level mobility decision.

In a twelfth implementation form of the method according to the first aspect as such or any preceding implementation form of the first aspect, wherein refining the cell-level mobility decision comprises at least one of determining that the BWP configuration of the BWP is available, determining that the BWP-specific reference signal is available, utilizing the BWP configuration parameters to scale mobility measurements, or determining the cell-level mobility decision until the refined cell-level mobility decision and the BWP-level mobility decision are harmonized.

In a thirteenth implementation form of the method according to the first aspect as such or any preceding implementation form of the first aspect, wherein the refined cell-level mobility decision and the BWP-level mobility decision are harmonized when a first target cell associated with the refined cell-level mobility decision and a second target cell associated with the BWP-level mobility decision are aligned.

In a fourteenth implementation form of the method according to the first aspect as such or any preceding implementation form of the first aspect, wherein the at least one BWP parameter comprises a bandwidth (BW) of the BWP, a subcarrier spacing (SCS) of the BWP, a cyclic prefix (CP) of the BWP, a BW of the cell, a BW of a carrier, a central frequency of the BWP, a central frequency of the cell, or a central frequency of the carrier.

In a fifteenth implementation form of the method according to the first aspect as such or any preceding implementation form of the first aspect, further comprising refining a cell-level mobility decision, by the UE, in accordance with BWP-level mobility measurements.

In a sixteenth implementation form of the method according to the first aspect as such or any preceding implementation form of the first aspect, wherein the mobility measurements comprises cell-specific mobility measurements, and wherein scaling the mobility measurements comprises applying, by the UE, a mathematical function to the cell-specific mobility measurements and the at least one BWP parameter.

In a seventeenth implementation form of the method according to the first aspect as such or any preceding implementation form of the first aspect, wherein the mathematical function comprises a multiplication function.

According to a second aspect, a method for mobility management implemented by an access node is provided. The method includes transmitting, by the access node, a measurement configuration associated with a mobility procedure, wherein a cell and a BWP is a target for the mobility procedure, receiving, by the access node, from a UE, a first report including mobility measurements made in accordance with a cell-specific parameter or a BWP-specific parameter specified in the measurement configuration, and scaling, by the access node, the first report in accordance with at least one BWP-specific parameter specified in the measurement configuration.

In a first implementation form of the method according to the second aspect as such, wherein the measurement configuration further includes a BWP configuration of a BWP.

In a second implementation form of the method according to the second aspect as such or any preceding implementation form of the second aspect, further comprising receiving, by the access node, from the UE, a second report including at least one of a BWP-level mobility decision or BWP-scaled measurements.

In a third implementation form of the method according to the second aspect as such or any preceding implementation form of the second aspect, further comprising receiving, by the access node, from the UE, a third report including at least one of a refined cell-level mobility decision or a refined BWP-level mobility decision.

In a fourth implementation form of the method according to the second aspect as such or any preceding implementation form of the second aspect, further comprising determining, by the access node, a BWP-level mobility decision or a cell-level mobility decision in accordance with the first report, and refining, by the access node, at least one of the BWP-level mobility decision or the cell-level mobility decision in accordance with the scaled first report and thereby producing at least one of a refined BWP-level mobility decision or a refined cell-level mobility decision.

In a fifth implementation form of the method according to the second aspect as such or any preceding implementation form of the second aspect, wherein producing the at least one of the refined BWP-level mobility decision or the refined cell-level mobility decision comprises selectively combining, sequentially combining, iteratively combining, or recursively combining the cell-level mobility decision and the BWP-level mobility decision to harmonize them in a selected target cell for the UE.

In a sixth implementation form of the method according to the second aspect as such or any preceding implementation form of the second aspect, further comprising scaling, by the access node, the mobility measurements thereby producing scaled mobility measurements, and determining, by the access node, a BWP-level mobility decision or a cell-level mobility decision in accordance with the scaled mobility measurements.

In a seventh implementation form of the method according to the second aspect as such or any preceding implementation form of the second aspect, wherein determining the refined BWP-level mobility decision or the cell-level mobility decision further comprises selectively combining, sequentially combining, iteratively combining, or recursively combining BWP-level mobility decisions or cell-level mobility decisions.

According to a third aspect, a method implemented by a UE is provided. The method includes measuring, by the UE, at least one of a cell-specific reference signal or a BWP-specific reference signal, thereby producing mobility measurements, and determining, by the UE, a mobility decision in accordance with the mobility measurements, a BWP-level mobility criterion, and a cell-level mobility criterion, wherein the mobility decision includes at least one of a target cell or a target BWP.

In a first implementation form of the method according to the third aspect as such, wherein determining the mobility decision comprises combining, by the UE, the target cell and the target BWP to harmonize at least one of a cell-level mobility procedure or a BWP-level mobility procedure.

In a second implementation form of the method according to the third aspect as such or any preceding implementation form of the third aspect, wherein combining the target cell and the target BWP comprises revising, by the UE, at least one of the target cell or the target BWP to meet the cell-level mobility criterion and the BWP-level mobility criterion, and to ensure that after the revising the target BWP is associated with the target cell.

In a third implementation form of the method according to the third aspect as such or any preceding implementation form of the third aspect, wherein revising the at least one of the target cell or the target BWP is performed recursively.

In a fourth implementation form of the method according to the third aspect as such or any preceding implementation form of the third aspect, wherein determining the mobility decision comprises selectively combining, sequentially combining, iteratively combining, or recursively combining the target cell and the target BWP to harmonize at least one of a cell-level mobility procedure or a BWP-level mobility procedure.

In a fifth implementation form of the method according to the third aspect as such or any preceding implementation form of the third aspect, wherein harmonizing the at least one of the cell-level procedure or the BWP-level mobility procedure comprises determining, by the UE, at least one of a second target BWP or a second target cell, wherein the second target BWP meets the BWP-level criterion, the second target cell meets the cell-level criterion, and the second target BWP is associated with the second cell.

In a sixth implementation form of the method according to the third aspect as such or any preceding implementation form of the third aspect, wherein the BWP-level mobility procedure comprises at least one of a BWP switching, BWP selection, or BWP reselection.

In a seventh implementation form of the method according to the third aspect as such or any preceding implementation form of the third aspect, wherein the cell-level mobility procedure comprises at least one of a cell-level handover, cell selection, or cell reselection.

In an eighth implementation form of the method according to the third aspect as such or any preceding implementation form of the third aspect, wherein the mobility measurements are scaled by a BWP-level parameter.

In a ninth implementation form of the method according to the third aspect as such or any preceding implementation form of the third aspect, wherein the mobility measurements comprise cell-specific mobility measurements and BWP-specific mobility measurements, and wherein combining the target cell and the target BWP comprises scaling, by the UE, at least one of the cell-specific mobility measurements or the BWP-specific mobility measurements, and revising, by the UE, at least one of the target cell or the target BWP to meet the cell-level mobility criterion and the BWP-level mobility criterion, and to ensure that the target BWP is associated with the target cell.

According to a fourth aspect, a method implemented by an access node is provided. The method includes transmitting, by the access node, at least one of a cell-specific reference signal or a BWP-specific reference signal, receiving, by the access node, a report including mobility measurements made in accordance with the at least one of the cell-specific reference signal or the BWP specific reference signal, determining, by the access node, a mobility decision in accordance with the mobility measurements, a BWP-level mobility criterion, and a cell-level mobility criterion, wherein the mobility decision includes at least one of a target cell or a target BWP, and transmitting, by the access node, to a user equipment (UE), the mobility decision.

In a first implementation form of the method according to the fourth aspect as such, wherein determining the mobility decision comprises combining, by the access node, the target cell and the target BWP to harmonize at least one of a cell-level mobility procedure or a BWP-level mobility procedure.

In a second implementation form of the method according to the fourth aspect as such or any preceding implementation form of the fourth aspect, wherein combining the target cell and the target BWP comprises revising, by the access node, at least one of the target cell or the target BWP to meet the cell-level mobility criterion and the BWP-level mobility criterion, and to ensure that after the revising the target BWP is associated with the target cell.

In a third implementation form of the method according to the fourth aspect as such or any preceding implementation form of the fourth aspect, wherein determining the mobility decision comprises selectively combining, sequentially combining, iteratively combining, or recursively combining the target cell and the target BWP to harmonize at least one of a cell-level mobility procedure or a BWP-level mobility procedure.

In a fourth implementation form of the method according to the fourth aspect as such or any preceding implementation form of the fourth aspect, wherein harmonizing the at least one of the cell-level procedure or the BWP-level mobility procedure comprises determining, by the access node, at least one of a second target BWP or a second target cell, wherein the second target BWP meets the BWP-level criterion, the second target cell meets the cell-level criterion, and the second target BWP is associated with the second cell.

In a fifth implementation form of the method according to the fourth aspect as such or any preceding implementation form of the fourth aspect, wherein the cell-level mobility procedure comprises at least one of a HO, cell selection, or cell reselection.

In a sixth implementation form of the method according to the fourth aspect as such or any preceding implementation form of the fourth aspect, wherein the BWP-level mobility procedure comprises at least one of a BWP switching, BWP selection, or BWP reselection.

In a seventh implementation form of the method according to the fourth aspect as such or any preceding implementation form of the fourth aspect, wherein the mobility measurements are scaled by a BWP-level parameter.

In an eighth implementation form of the method according to the fourth aspect as such or any preceding implementation form of the fourth aspect, wherein the mobility measurements comprise cell-specific mobility measurements and BWP-specific mobility measurements, and wherein determining the mobility decision comprises scaling, by the access node, at least one of the cell-specific mobility measurements or the BWP-specific mobility measurements, and selecting, by the access node, the at least one of the target cell or the target BWP in accordance with the scaled mobility measurements.

In a ninth implementation form of the method according to the fourth aspect as such or any preceding implementation form of the fourth aspect, wherein the at least one of the target cell or the target BWP is selected in accordance with at least one of the cell-level mobility criterion or the BWP-level mobility criterion.

In a tenth implementation form of the method according to the fourth aspect as such or any preceding implementation form of the fourth aspect, wherein determining the mobility decision comprises revising, by the access node, the at least one of the target cell or the target BWP to ensure that the target BWP is associated with the target cell.

According to a fifth aspect, a UE is provided. The UE includes a non-transitory memory storage comprising instructions, and one or more processors in communication with the memory storage. The one or more processors execute the instructions to measure a reference signal thereby producing mobility measurements for a mobility procedure, wherein the reference signal is associated with one of a cell or a BWP, and scale the mobility measurements in accordance with at least one BWP parameter.

In a first implementation form of the method according to the fifth aspect as such, wherein the one or more processors further execute the instructions to report at least one of the mobility measurements or the scaled mobility measurements, and receive a mobility decision determined based on the report.

In a second implementation form of the method according to the fifth aspect as such or any preceding implementation form of the fifth aspect, wherein the one or more processors further execute the instructions to determine that a BWP-specific reference signal associated with the BWP is available, and based thereon, measure the BWP-specific reference signal thereby producing BWP-specific mobility measurements, and determine that the BWP-specific reference signal needs scaling, and based thereon, scale the BWP-specific mobility measurements thereby producing scaled BWP-specific mobility measurements.

In a third implementation form of the method according to the fifth aspect as such or any preceding implementation form of the fifth aspect, wherein the one or more processors further execute the instructions to determine that the BWP-specific reference signal is available, and based thereon, report the BWP-specific mobility measurements, and receive a BWP-level mobility decision based on the reports.

In a fourth implementation form of the method according to the fifth aspect as such or any preceding implementation form of the fifth aspect, wherein mobility measurements comprise cell-specific mobility measurements and BWP-specific mobility measurements, and wherein the one or more processors further execute the instructions to report at least one of the cell-specific mobility measurements or the BWP-specific mobility measurements, and receive a harmonized mobility decision based on the report.

In a fifth implementation form of the method according to the fifth aspect as such or any preceding implementation form of the fifth aspect, wherein mobility measurements comprises cell-specific mobility measurements and BWP-specific mobility measurements, and wherein the one or more processors further execute the instructions to combine scaled cell-level mobility measurements and BWP-level mobility measurements, thereby producing a combined measurement, and determine a harmonized mobility decision in accordance with the combined measurement.

In a sixth implementation form of the method according to the fifth aspect as such or any preceding implementation form of the fifth aspect, wherein the one or more processors further execute the instructions to determine a cell-level mobility decision in accordance with the mobility measurements, and determine that a BWP configuration of the BWP is available, and based thereon, refine the cell-level mobility decision in accordance with the scaled mobility measurements, and report the refined cell-level mobility decision.

In a seventh implementation form of the method according to the fifth aspect as such or any preceding implementation form of the fifth aspect, wherein the one or more processors further execute the instructions to determine that a BWP-specific reference signal is available, and based thereon, measure the BWP-specific reference signal, thereby producing BWP-level mobility measurements, and determine a BWP-level mobility decision in accordance with the BWP-level mobility measurements.

In an eighth implementation form of the method according to the fifth aspect as such or any preceding implementation form of the fifth aspect, wherein the one or more processors further execute the instructions to determine that the BWP configuration of the BWP is available, and based thereon scale the BWP-level mobility measurements in accordance with parameters of the BWP configuration, determine a refined BWP-level mobility decision based on the scaled BWP-level mobility measurements, and report at least one of the scaled BWP-level mobility measurements or the refined BWP-level mobility decision.

In a ninth implementation form of the method according to the fifth aspect as such or any preceding implementation form of the fifth aspect, wherein the one or more processors further execute the instructions to determine that the BWP-specific reference signal is available, and based thereon determine a refined cell-level mobility decision in accordance with at least one of a scaled cell-specific mobility measurement, the BWP-level mobility decision, or the BWP-level mobility measurements, and perform a cell-level mobility process based on the refined cell-level mobility decision.

In a tenth implementation form of the method according to the fifth aspect as such or any preceding implementation form of the fifth aspect, wherein the one or more processors further execute the instructions to combine the cell-level mobility decision, the BWP-level mobility measurements, and the BWP-level mobility decision.

In an eleventh implementation form of the method according to the fifth aspect as such or any preceding implementation form of the fifth aspect, wherein the one or more processors further execute the instructions to at least one of selectively combine, iteratively combine, recurrently combine, or sequentially combine the refined cell-level mobility decision, the BWP-level mobility measurements, and the BWP-level mobility decision.

In a twelfth implementation form of the method according to the fifth aspect as such or any preceding implementation form of the fifth aspect, wherein the one or more processors further execute the instructions to at least one of determine that the BWP configuration of the BWP is available, determine that the BWP-specific reference signal is available, utilize the BWP configuration parameters to scale mobility measurements, or determine the cell-level mobility decision until the refined cell-level mobility decision and the BWP-level mobility decision are harmonized.

In a thirteenth implementation form of the method according to the fifth aspect as such or any preceding implementation form of the fifth aspect, wherein the refined cell-level mobility decision and the BWP-level mobility decision are harmonized when a first target cell associated with the refined cell-level mobility decision and a second target cell associated with the BWP-level mobility decision are aligned.

In a fourteenth implementation form of the method according to the fifth aspect as such or any preceding implementation form of the fifth aspect, wherein the at least one BWP parameter comprises a BW of the BWP, a SCS of the BWP, a CP of the BWP, a BW of the cell, a BW of a carrier, a central frequency of the BWP, a central frequency of the cell, or a central frequency of the carrier.

In a fifteenth implementation form of the method according to the fifth aspect as such or any preceding implementation form of the fifth aspect, wherein the one or more processors further execute the instructions to refine a cell-level mobility decision in accordance with BWP-level mobility measurements.

In a sixteenth implementation form of the method according to the fifth aspect as such or any preceding implementation form of the fifth aspect, wherein the mobility measurements comprises cell-specific mobility measurements, and wherein scaling the mobility measurements comprises applying, by the UE, a mathematical function to the cell-specific mobility measurements and the at least one BWP parameter.

In a seventeenth implementation form of the method according to the fifth aspect as such or any preceding implementation form of the fifth aspect, wherein the mathematical function comprises a multiplication function.

According to a sixth aspect, an access node is provided. The access node includes a non-transitory memory storage comprising instructions, and one or more processors in communication with the memory storage. The one or more processors execute the instructions to transmit a measurement configuration associated with a mobility procedure, wherein a cell and a BWP is a target for the mobility procedure, receive from a UE, a first report including mobility measurements made in accordance with a cell-specific parameter or a BWP-specific parameter specified in the measurement configuration, and scale the first report from the UE in accordance with at least one BWP-specific parameter specified in the measurement configuration.

In a first implementation form of the method according to the sixth aspect as such, wherein the measurement configuration further includes a BWP configuration of a BWP.

In a second implementation form of the method according to the sixth aspect as such or any preceding implementation form of the sixth aspect, wherein the one or more processors further execute the instructions to receive, from the UE, a second report including at least one of a BWP-level mobility decision or BWP-scaled measurements.

In a third implementation form of the method according to the sixth aspect as such or any preceding implementation form of the sixth aspect, wherein the one or more processors further execute the instructions to receive, from the UE, a third report including at least one of a refined cell-level mobility decision or a refined BWP-level mobility decision.

In a fourth implementation form of the method according to the sixth aspect as such or any preceding implementation form of the sixth aspect, wherein the one or more processors further execute the instructions to determine a BWP-level mobility decision or a cell-level mobility decision in accordance with the first report, and refine at least one of the BWP-level mobility decision or the cell-level mobility decision in accordance with the scaled first report and thereby producing at least one of a refined BWP-level mobility decision or a refined cell-level mobility decision.

In a fifth implementation form of the method according to the sixth aspect as such or any preceding implementation form of the sixth aspect, wherein the one or more processors further execute the instructions to selectively combine, sequentially combine, iteratively combine, or recursively combine the cell-level mobility decision and the BWP-level mobility decision to harmonize them in a selected target cell for the UE.

In a sixth implementation form of the method according to the sixth aspect as such or any preceding implementation form of the sixth aspect, wherein the one or more processors further execute the instructions to scale the mobility measurements thereby producing scaled mobility measurements, and determine a BWP-level mobility decision or a cell-level mobility decision in accordance with the scaled mobility measurements.

In a seventh implementation form of the method according to the sixth aspect as such or any preceding implementation form of the sixth aspect, wherein the one or more processors further execute the instructions to selectively combine, sequentially combine, iteratively combine, or recursively combine BWP-level mobility decisions or cell-level mobility decisions.

According to a seventh aspect, a UE is provided. The UE includes a non-transitory memory storage comprising instructions, and one or more processors in communication with the memory storage. The one or more processors execute the instructions to measure at least one of a cell-specific reference signal or a BWP-specific reference signal, thereby producing mobility measurements, and determine a mobility decision in accordance with the mobility measurements, a BWP-level mobility criterion, and a cell-level mobility criterion, wherein the mobility decision includes at least one of a target cell or a target BWP.

In a first implementation form of the method according to the seventh aspect as such, wherein the one or more processors further execute the instructions to combine the target cell and the target BWP to harmonize at least one of a cell-level mobility procedure or a BWP-level mobility procedure.

In a second implementation form of the method according to the seventh aspect as such or any preceding implementation form of the seventh aspect, wherein the one or more processors further execute the instructions to revise at least one of the target cell or the target BWP to meet the cell-level mobility criterion and the BWP-level mobility criterion, and to ensure that after the revising the target BWP is associated with the target cell.

In a third implementation form of the method according to the seventh aspect as such or any preceding implementation form of the seventh aspect, wherein revising the at least one of the target cell or the target BWP is performed recursively.

In a fourth implementation form of the method according to the seventh aspect as such or any preceding implementation form of the seventh aspect, wherein the one or more processors further execute the instructions to selectively combine, sequentially combine, iteratively combine, or recursively combine the target cell and the target BWP to harmonize at least one of a cell-level mobility procedure or a BWP-level mobility procedure.

In a fifth implementation form of the method according to the seventh aspect as such or any preceding implementation form of the seventh aspect, wherein the one or more processors further execute the instructions to determine at least one of a second target BWP or a second target cell, wherein the second target BWP meets the BWP-level criterion, the second target cell meets the cell-level criterion, and the second target BWP is associated with the second cell.

In a sixth implementation form of the method according to the seventh aspect as such or any preceding implementation form of the seventh aspect, wherein the BWP-level mobility procedure comprises at least one of a BWP switching, BWP selection, or BWP reselection.

In a seventh implementation form of the method according to the seventh aspect as such or any preceding implementation form of the seventh aspect, wherein the cell-level mobility procedure comprises at least one of a cell-level handover, cell selection, or cell reselection.

In an eighth implementation form of the method according to the seventh aspect as such or any preceding implementation form of the seventh aspect, wherein the mobility measurements are scaled by a BWP-level parameter.

In a ninth implementation form of the method according to the seventh aspect as such or any preceding implementation form of the seventh aspect, wherein the mobility measurements comprise cell-specific mobility measurements and BWP-specific mobility measurements, and wherein the one or more processors further execute the instructions to scale at least one of the cell-specific mobility measurements or the BWP-specific mobility measurements, and revise at least one of the target cell or the target BWP to meet the cell-level mobility criterion and the BWP-level mobility criterion, and to ensure that the target BWP is associated with the target cell.

According to an eighth aspect, an access node is provided. The access node includes a non-transitory memory storage comprising instructions, and one or more processors in communication with the memory storage. The one or more processors execute the instructions to transmit at least one of a cell-specific reference signal or a BWP-specific reference signal, receive a report including mobility measurements made in accordance with the at least one of the cell-specific reference signal or the BWP specific reference signal, determine a mobility decision in accordance with the mobility measurements, a BWP-level mobility criterion, and a cell-level mobility criterion, wherein the mobility decision includes at least one of a target cell or a target BWP, and transmit to a UE, the mobility decision.

In a first implementation form of the method according to the eighth aspect as such, wherein the one or more processors further execute the instructions to combine the target cell and the target BWP to harmonize at least one of a cell-level mobility procedure or a BWP-level mobility procedure.

In a second implementation form of the method according to the eighth aspect as such or any preceding implementation form of the eighth aspect, wherein the one or more processors further execute the instructions to revise at least one of the target cell or the target BWP to meet the cell-level mobility criterion and the BWP-level mobility criterion, and to ensure that after the revising the target BWP is associated with the target cell.

In a third implementation form of the method according to the eighth aspect as such or any preceding implementation form of the eighth aspect, wherein the one or more processors further execute the instructions to selectively combine, sequentially combine, iteratively combine, or recursively combine the target cell and the target BWP to harmonize at least one of a cell-level mobility procedure or a BWP-level mobility procedure.

In a fourth implementation form of the method according to the eighth aspect as such or any preceding implementation form of the eighth aspect, wherein the one or more processors further execute the instructions to determine at least one of a second target BWP or a second target cell, wherein the second target BWP meets the BWP-level criterion, the second target cell meets the cell-level criterion, and the second target BWP is associated with the second cell.

In a fifth implementation form of the method according to the eighth aspect as such or any preceding implementation form of the eighth aspect, wherein the cell-level mobility procedure comprises at least one of a HO, cell selection, or cell reselection.

In a sixth implementation form of the method according to the eighth aspect as such or any preceding implementation form of the eighth aspect, wherein the BWP-level mobility procedure comprises at least one of a BWP switching, BWP selection, or BWP reselection.

In a seventh implementation form of the method according to the eighth aspect as such or any preceding implementation form of the eighth aspect, wherein the mobility measurements are scaled by a BWP-level parameter.

In an eighth implementation form of the method according to the eighth aspect as such or any preceding implementation form of the eighth aspect, wherein the mobility measurements comprise cell-specific mobility measurements and BWP-specific mobility measurements, and wherein the one or more processors further execute the instructions to scale at least one of the cell-specific mobility measurements or the BWP-specific mobility measurements, and select the at least one of the target cell or the target BWP in accordance with the scaled mobility measurements.

In a ninth implementation form of the method according to the eighth aspect as such or any preceding implementation form of the eighth aspect, wherein the at least one of the target cell or the target BWP is selected in accordance with at least one of the cell-level mobility criterion or the BWP-level mobility criterion.

In a tenth implementation form of the method according to the eighth aspect as such or any preceding implementation form of the eighth aspect, wherein the one or more processors further execute the instructions to revise the at least one of the target cell or the target BWP to ensure that the target BWP is associated with the target cell.

Practice of the foregoing embodiments enables a simple and uniform measurement framework with metrics measured using BWP specific reference signals or scaled by signaled BWP parameters.

BRIEF DESCRIPTION OF THE DRAWINGS

For a more complete understanding of the present disclosure, and the advantages thereof, reference is now made to the following descriptions taken in conjunction with the accompanying drawings, in which:

FIGS. 3A-3D illustrate example BWP usage scenarios according to example embodiments described herein;

FIGS. 1A and 1B illustrate flow diagrams of operations occurring at a source access node (AN) and a UE performing measurements and mobility according to example embodiments described herein;

DETAILED DESCRIPTION OF ILLUSTRATIVE EMBODIMENTS

Figure 1:
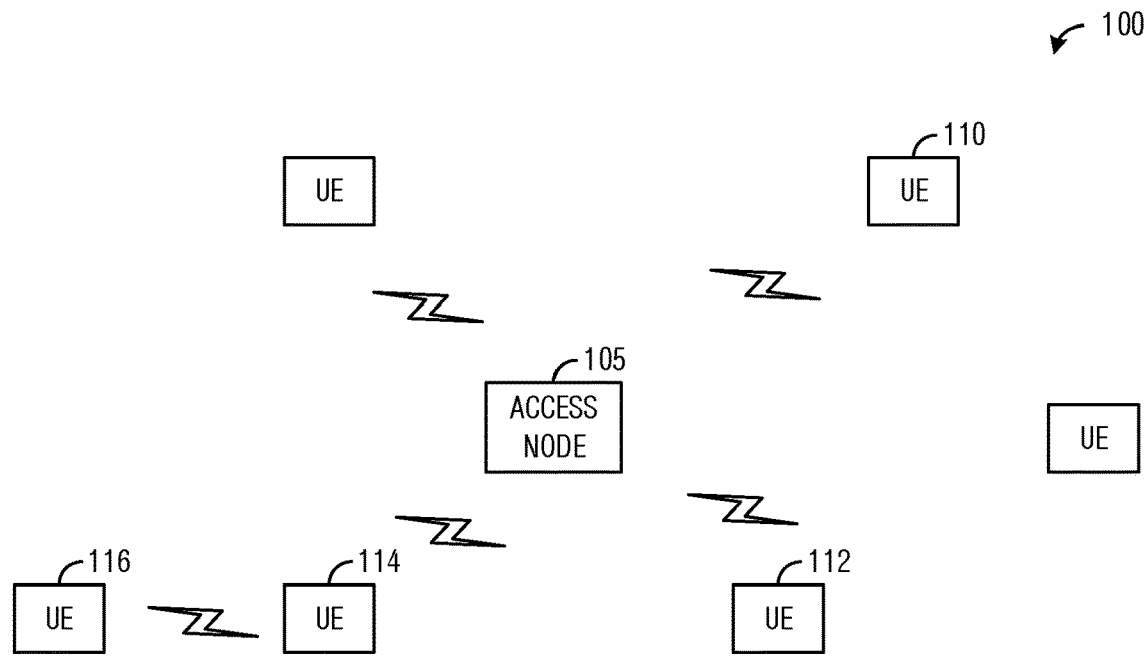
FIG. 1 illustrates an example wireless communications system according to example embodiments described herein.

The making and using of the disclosed embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

The following terminology are used throughout this discussion:

| | | | |
|---|---|---|---|
| RRM: Radio Resource Management | 5G: Fifth Generation | NextGen: Next Generation (NG) | CA: Carrier Aggregation |
| BLER: Block Error Rate | LF: Low Frequency | BFR: Beam (link) Failure Recovery | NR: New Radio (i.e., 5G access) |
| CH: Channel | UE: User Equipment, or device | QCL: Quasi-Co-Location | CN: Core Network |
| Pcell/Pscell/Scell: Primary, Primary Secondary, or Secondary cell | DCI in PDCCH: Downlink control Info in Physical Downlink Control Channel | UCI in PUCCH/PUSCH: Uplink Control info in Physical Uplink Control or Shared Channel | RS: Reference Signal at L1 (could be UL uplink or DL downlink) |
| RLF: Radio Link Failure | DL/UL: Downlink or Uplink | RLM: Radio Link Management | CDM: Code Division Multiplexing |
| KPI: Key Performance Index | CE: control element | TDM: Time Division Multiplexing | RAR: Random Access Response |
| RAN: Radio Access Network (for LTE access) | E-UTRAN: basically referring to 4G LTE radio access network or RAN | MCG/SCG: Master Cell Group or Secondary Cell Group | HetNet: Heterogeneous Network |
| BRF: Beam (failure) Recovery Failure | MC: Multi-connectivity | SRS: Sounding Reference Signal | CORESET: Control resource set, signaled by SI |
| CC: Component carrier | SUL: Supplemental Uplink | FDM: Frequency Division Multiplexing | RNC: Radio Network Controller in 3G |
| SR: Scheduling Request | RMSI: remaining MSI (SIB1) | OSI: other SI (SIB2~SIB3 . . .) | NGC: Next Generation Core Network (5G CN) |
| gNB: next generation (5G) of eNB (LTE base station), which may include one CU (Central Unit) and one or more DUs (Distributed Units) | SIB: System Information Block | CA: Carrier Aggregation | IS: In Sync OOS: Out of Sync |
| HF: High Frequency | L2: Layer 2 | DC: Dual Connectivity | CRS: cell-specific RS |
| CF: central frequency | TOS: Time of Staying | TTT: Time To Trigger | BWP: Bandwidth Part |
| HO: Handover | HOF: Handover Failure | MAC: Medium Access Control | UDN: Untra-Dense Network |
| EPC: Evolved Packet Core -- 4G Core Network | CRS: cell specific RS at L1 along DL (from the network to the UE) | PDCCH: Physical Downlink Control Channel | L1/L3: Layer 1 or Layer 3 (normally referring to as Phy layer or RRC layer, respectively) |

-continued

| | | | |
|---|---|---|---|
| MM: Mobility Management, referring to switching of serving nodes (or serving carriers) due to UE's mobility, and often incurring L2 (Layer 2) or L3 (Layer 3) signaling and even data transfer or split between the nodes and with the UE for the switch. Conventional Mobility schemes includes UE-based HO (forward HO, RLF HO, NAS recovery HO, all involving the cell selection and cell reselection) and network-controlled HO (backward HO). | BM: Beam Management, referring to any beam-specific operations, particularly beam alignment, beam refinement, beam tracking, and beam switching with respect to the same serving node, node family (TRP and its parent cell or gNB), or strictly synchronized nodes (multiple TRPs that literally cannot be distinguished by UE from beam operations' perspective.) | TRP: Transmission And Reception Point (the unit of serving node inside yet at the edge of a network, talking to the UE over the air radio), typically referring to RRH w or w/o PHY or MAC. | CSI-RS/DM-RS/SS Block/PSS/SSS: acronyms for reference signal (RS) or Primary or Secondary Synchronization Signals (PSS or SSS), normally called collectively xSS or xRS. |
| NG-C: Next Generation (Core Network) Control Plane in 5G | NG-U: Next Generation (Core Network) User Plane in 5G | MSI: Minimum System Information (=MIB + SIB1) | CU: central unit, normally hosting L3 RRC, PDCP protocol layers; DU: distributed unit, normally hosting RLC, or MAC, or PHY, etc. |
| AN: (Radio) Access Node, such as a TRP or a base station (e.g., a gNB). | ED: End Device | SSB: SS refers to PSS and/or SSS; SSB implicitly refers to SS and/or PBCH block and is often denoted as SS/PBCH Block, or simply SS Block. | SMTC: SS block based RRM measurement timing configuration |

FIG. 1 illustrates an example wireless communications system 100. Communications system 100 includes an access node 105 serving a plurality of UEs, including UEs 110, 112, 114, and 116. In a first communications mode, transmissions originating from or destined for a UE pass through access node 105. In a second communications mode, UEs can communicate directly with one another without having access node 105 serving as an intermediary.

Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femto cells, pico cells, and so on, while UEs may also be commonly referred to as mobile stations, mobiles, terminals, users, subscribers, stations, and the like. Access nodes may provide wireless access in accordance with one or more wireless communication protocols, e.g., long term evolution (LTE), LTE advanced (LTE-A), 5G, 5G LTE, 5G NR, High Speed Packet Access (HSPA), Wi-Fi 802.11a/b/g/n/ac/ax/ad/ay, etc. While it is understood that communications systems may employ multiple access nodes capable of communicating with a number of UEs, only one access node, and a number of UEs are illustrated for simplicity.

As used herein, the term network refers to any of a variety of network entities that perform operations to configure or control the operation of the communications system. Examples of network entities include but are not limited to access nodes, communications controllers, mobility management entities (MMEs), Core Access and Mobility Management Function (AMF), Session Management Function (SMF), and so on.

As related to measurement configuration, the network may configure the UE to perform the following NR measurements (based on different RS types, e.g., SS such as PSS or SSS or PBCH Block, or CSI-RS):

SS or PBCH Block based intra-frequency measurements: measurements at SSB(s) of neighbour cell(s) where both the center frequency (or frequencies) and subcarrier spacing are the same as the serving cell defining SS and PBCH Block (CD-SSB), which is defined as cell specific. Note that by the time of this invention creation, it is not clear whether this definition applies to non-cell defining serving SSB, e.g., Bandwidth Part (BWP)-specific SSB in both serving and neighbouring cells, but in reality, the difference between CD-SSB and serving BWP is often the source of measurement inaccuracy.

SS or PBCH Block based inter-frequency measurements: measurements at SSB(s) of neighbour cell(s) that have different center frequency (or frequencies) or different subcarrier spacing compared to the serving CD-SSB. Similar comments apply to the non-CD serving SSB.

CSI-RS based intra-frequency measurements: measurements at CSI-RS(s) resource(s) of configured neighbour cell(s) whose bandwidth(s) are within the bandwidth(s) of the CSI-RS resource(s) on the serving cell(s) configured for measurements and having the same subcarrier spacing as the CSI-RS resource(s) on the serving cell(s) configured for measurements.

CSI-RS based inter-frequency measurements: measurements at CSI-RS(s) resource(s) of configured neighbour cell(s) whose bandwidth(s) are not within the bandwidth(s) or having different subcarrier spacing compared to the CSI-RS resource(s) on the serving cell(s) configured for measurements.

The network may configure the UE to report the following measurement information based on SS or PBCH block(s):

Measurement results per SS or PBCH block;

Measurement results per cell based on CD-SSB, i.e., cell-defining SS or PBCH block(s);

SS/PBCH block(s) indexes regardless whether it is CD-SSB or BW-specific SSB.

The network may configure the UE to report the measurement information based on CSI-RS resources similarly to SS or PBCH resources. The measurement results may be per CSI-RS resource; Or the measurement results may be per cell based on CSI-RS resource(s); The measurement results may include or are identified by the CSI-RS resource measurement identifiers.

For inter-RAT E-UTRA measurements, a measurement object (MO) corresponds to a single EUTRA carrier frequency. For intra-frequency and inter-frequency NR measurements, a measurement object is associated with an NR carrier frequency. Associated with this NR carrier frequency, the network may configure a list of cell specific offsets, a list of 'blacklisted' cells, and a list of 'whitelisted' cells. UE determines which MO corresponds to the serving cell frequency from the frequency location of the CD-SSB that is contained within the serving cell configuration.

Figure 2:
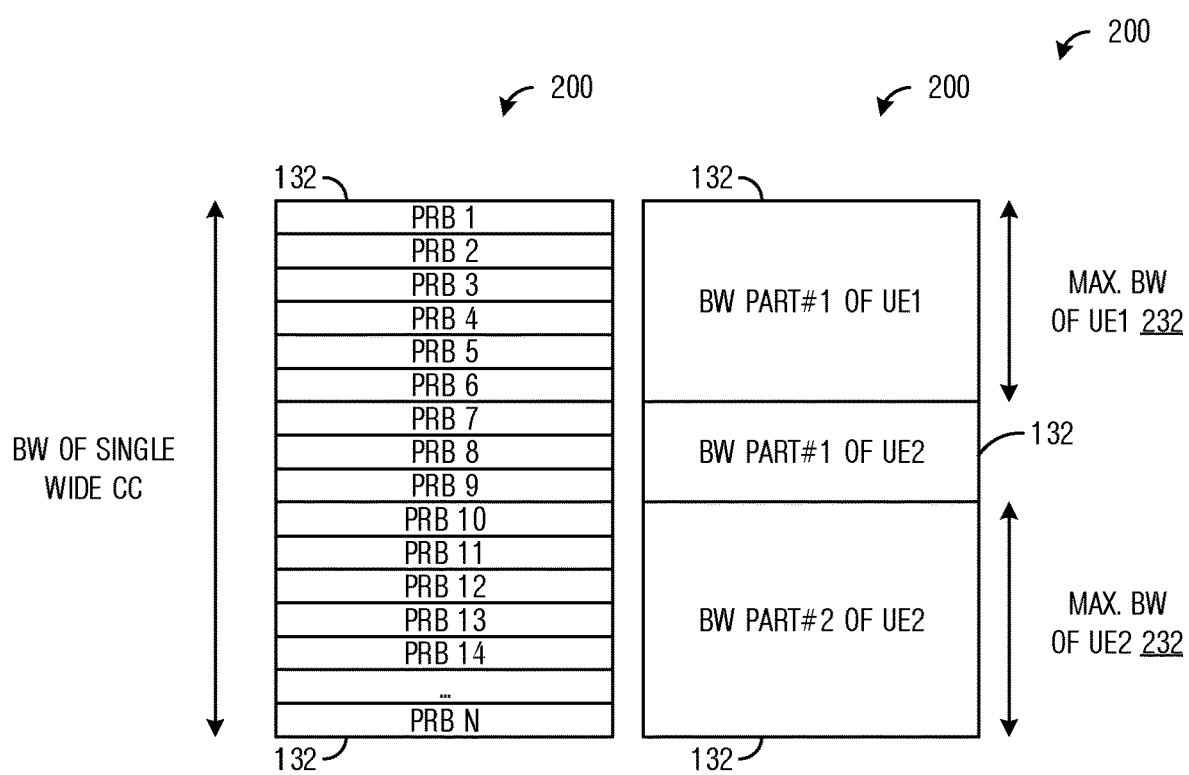
FIG. 2 illustrates a diagram of the concept of a BWP according to example embodiments described herein.
Figure 3C:
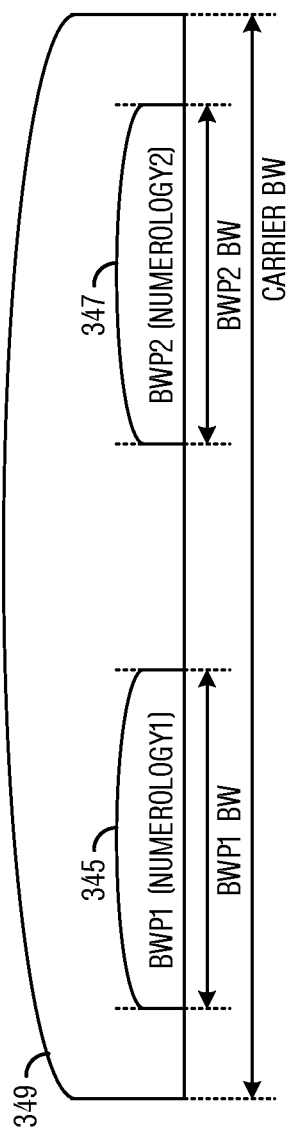
Figure 3D:
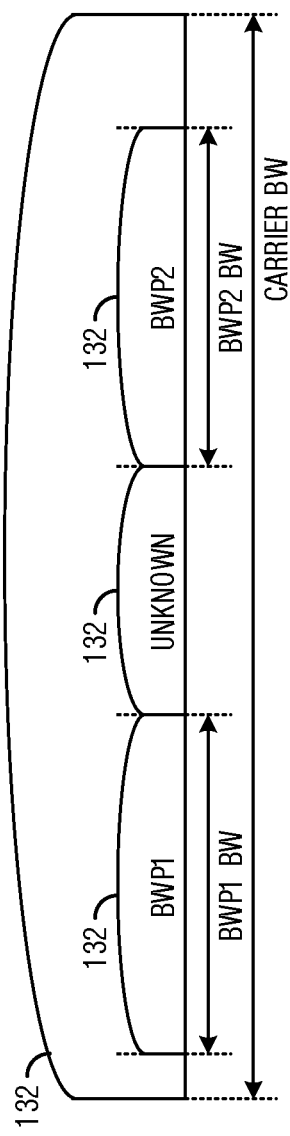

FIG. 2 illustrates a diagram of the concept of a BWP. A BWP is a per-UE concept. In a cell or wide-band carrier, a UE may be configured with multiple BWPs, but 3GPP Rel-15 supports only one active BWP at any moment. The parameters to construct a BWP include: numerology (i.e., subcarrier spacing, cyclic prefix (CP), symbol duration); frequency location of BWP; bandwidth of BWP; Control Resource Set (CORESET) configuration that may have an association to one or more DL BWP. When a UE performs measurement or transmit SRS outside of its active BWP, it is considered as a measurement gap.

The recently introduced BWP concepts in 3GPP Release 15 caused some confusion on UE-side measurement operations over a wideband component carrier:

Multiple BWP's can be configured for a UE on a wideband Component Carrier (or cell), but for the UE, not each BWP can be active in a single cell (over a primary or secondary carrier, or a supplemental uplink carrier). Yet (e.g., in a non-standalone CC), not every BWP carries SSB or CSI-RS for UE to measure.

Additionally multiple BWP scenarios, based on BWP configurations of (NR-) ARFCN central frequencies, bandwidths, metrics thresholds, or numerologies, may coexist in a single cell among different UEs.

It is unclear how a UE uses the cell-defining SSB, not necessarily located within a target BWP's frequency range in serving or neighboring cells, to accurately measure future or candidate serving BWPs for HO or cell (re)selection purposes.

As agreed by RAN1 and RAN2 so far, BWP has no direct impact on RRM. Contradictorily, in 3GPP TS 38.304 or 3GPP TS 38.331, some BWP parameters (e.g., BW and numerology) are implicitly associated to CSI-RS, or partially (e.g., only its numerology) associated to "cell-defining" SSB, inside NR measurement related configuration (e.g., MO and measurement report configuration). The network may explicitly signal BWP or BWP-configuration parameters in RRC for RRM measurement, making BWP impact RRM directly and explicitly, which may be considered of too much signaling overhead.

Problems to proposed solutions include:

CSI-RS can be defined to cover the whole BW (e.g., up to 400 MHz) and reflect the exact numerology of BWP. Hence CSI-RS is more accurate than SSB, which has only fixed small BW of 1.4 MHz, in reflecting the BWP. However, RRM measurement of neighbor cells based on CSI-RS is difficult: for an non-active BWP in a neighbor cell, where no active connection exists with the UE, CSI-RS is either absent or otherwise causes severe signal contamination (even worse than LTE's CRS).

Though (a cell-defining) SSB can be more easily used in RRM for both serving and neighboring cells than CSI-RS, the current SSB-based RRM may not reflect the accurate channel situation of a BWP because the SSB's fixed BW (1.4 MHz) is much narrower than BWP's BW (up to 400 MHz), or SSB's central frequency may possibly be irrelevantly located than BWP's, and yet BWP channel may have natural frequency selectivity across its wide BW scope. A cell defining SSB measured by an inactive or idle state UE may not be accurate enough to support RRM (with respect to "R" or "S" metrics), or in other words, the cell (or BWP) selection or reselection (if the cell's wide-BW component carrier has BWP operations). The above may be even worse for RRM and handover in a connected mode mobility.

As related to BWP activation and switching, BWP activation and switching may be TDM pattern based (e.g., timer-based), or DCI-based with a dedicated DCI without data (because otherwise data transmission on a BWP implies BWP activation). On de-activated BWPs, the UE does not monitor the PDCCH and does not transmit on PUCCH, PRACH, and UL-SCH. However, the UE can transmit a SRS with a measurement gap. Transmitting a SRS may mean BWP activation. In FDD communications systems, DL and UL transmissions may independently switch active BWPs, while in TDD, DL and UL may simultaneously switch active BWPs.

As related on scheduling and HARQ for L1 BWP operation, HARQ processes for different numerologies of BWP are independent, with no definite conclusion for BWP with the same numerology so far. Support for HARQ retransmission between DL (or UL) BWP during active DL (or UL) BWP switching is provided, but the UE is not expected to send a HARQ-ACK after the active BWP switching. Inter-BWP scheduling (e.g., PDCCH in one BWP and PDSCH in another BWP) is supported.

FIGS. 3A-3D illustrate example BWP usage scenarios. BWP usage scenario #1 (shown in FIG. 3A) supports reduced UE BW capacity, with a BWP bandwidth 305 that is a subset of an overall carrier bandwidth 307. BWP usage scenario #2 (shown in FIG. 3B) supports reduced UE energy consumption by means of bandwidth adaptation, with different BWP bandwidths (such as a first BWP bandwidth 325 and a second BWP bandwidth 327) that are subsets of an overall carrier bandwidth 329, where the bandwidths differ based on energy consumption requirements, for example. BWP usage scenario #3 (shown in FIG. 3C) supports FDM of different (i.e., mixed) numerologies, with a first BWP bandwidth 345 and a second BWP bandwidth 347 that are subsets of an overall carrier bandwidth 349, where the BWPs have different numerologies. While BWP usage scenario #4 (shown in FIG. 3D) supports non-contiguous intra-band CA, with an unknown bandwidth 365 separating a first BWP bandwidth 367 and a second BWP bandwidth 367 that are subsets of an overall carrier bandwidth 369. Note that not every scenario has been supported by the standard.

Figure 4A:
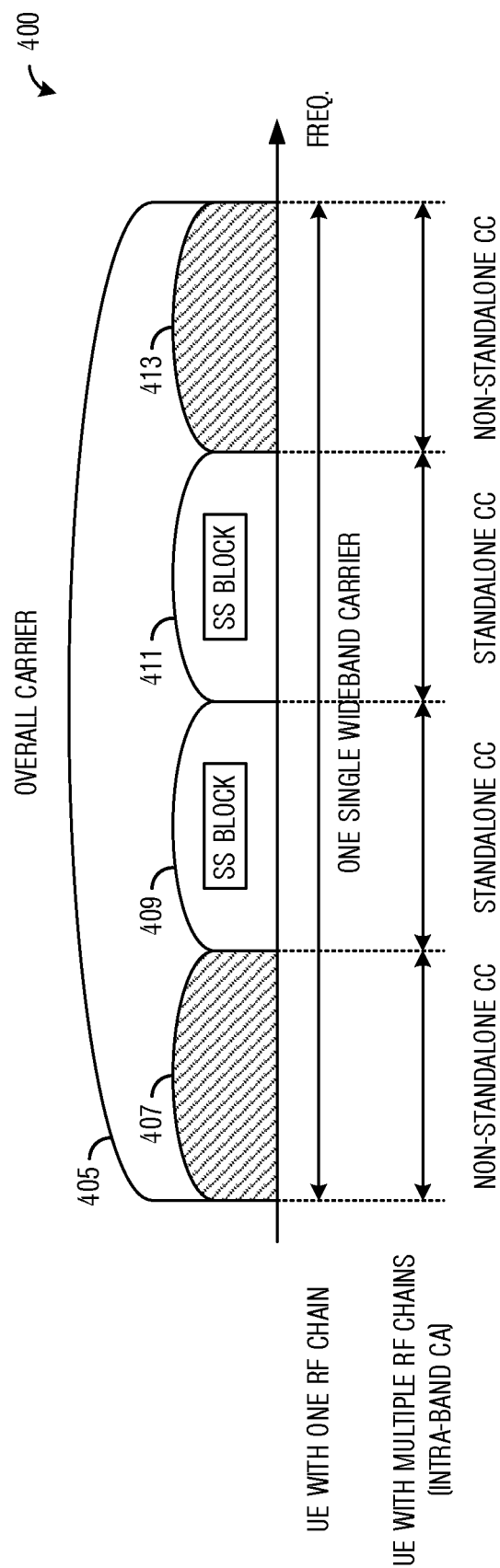
FIGS. 4A and 4B illustrate diagrams of example SS blocks in BWP(s) of a wideband CC versus CA according to example embodiments described herein.
Figure 4B:
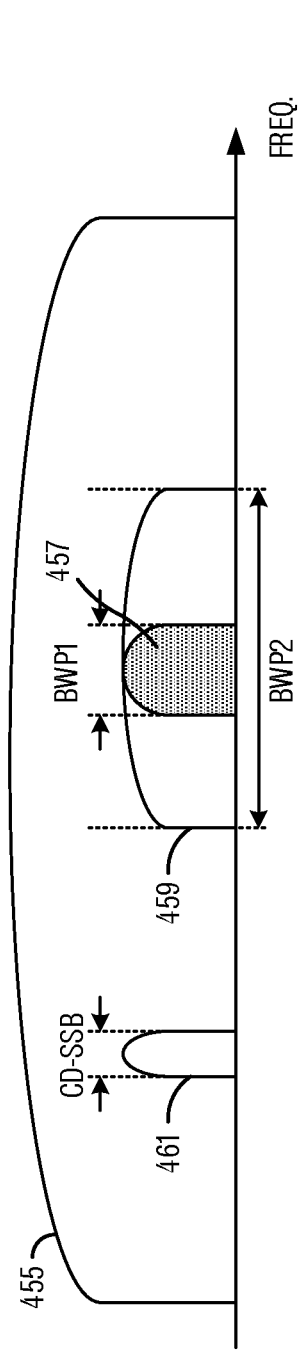

FIGS. 4A and 4B illustrate diagrams of example SS blocks in BWP(s) of a wideband CC versus CA. SS blocks are present in BWPs or a wideband (WB) CC. There is support for one or more SS blocks in a WB CC. Each BWP is associated with a specific numerology (e.g., sub-carrier spacing, CP type, etc.). In general, at least one configured DL BWP includes one CORESET with a common search space, and each configured DL BWP includes at least one UE-specific search space. From a UE's perspective, a cell associated with a single SSB (i.e., the cell defining SS block (CD-SSB)) is considered as the time reference of the serving cell, as well as for RRM serving cell measurements based on a SSB (independent of which BWP is activated). It may be reconfigured using RRC without L2 involvement. In RAN2, the SSB of the cell where an idle or inactive UE is camping is the cell defining SSB. Uncertainty may be present when a Scell may not have a cell defining SS or PBCH block.

As shown in FIG. 4A, diagram 400 illustrates a carrier 405 with four component carriers 407, 409, 411, and 413. Two of the component carriers 409 and 411 are standalone component carriers with SS blocks, while two of the component carriers 407 and 413 are non-standalone component carriers without SS blocks. As shown in FIG. 4B, diagram 450 illustrates a carrier 455 with BWPs with differing bandwidth. Carrier 455 includes a first BWP 457 and a second BWP 459, where first BWP 457 has a smaller bandwidth than second BWP 459. Carrier 455 also includes a CD-SSB 461. CD-SSB 461 provides a timing reference for carrier 455. However CD-SSB 461 is not in the bandwidth of either first BWP 457 or second BWP 459.

For each serving cell, a maximal number of DL or UL configured BWPs (configured by UE-specific RRC signaling in the serving cell, for example) is 4 DL BWPs and 4 UL BWPs for paired (FDD) spectrum and 4 DL or UL BWP pairs for unpaired (TDD) spectrum. In SUL, there are 4 UL BWPs, with 1 or more BWPs for a serving primary cell (e.g., Pcell, PScell), or 0 or more BWP for a serving Scell.

Figure 5:
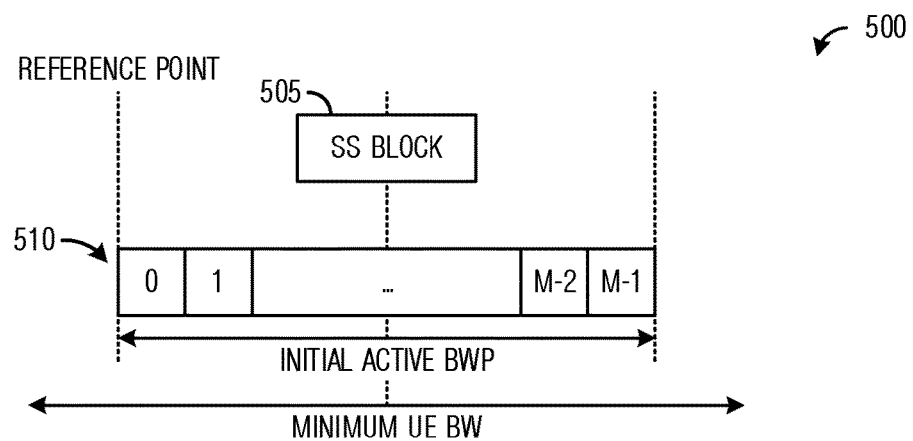
FIG. 5 illustrates a diagram of an example SS block and an initial active BWP according to example embodiments described herein.

FIG. 5 illustrates a diagram 500 of an example SS block 505 and an initial active BWP 510. As shown in FIG. 5, the BW of initial active BWP 510 is smaller than a minimum UE bandwidth. As related to the number of active BWPs, in Rel-15, for a UE, there is at most one active DL BWP and at most one active UL BWP at a given time for a serving cell. The activation or deactivation of a RRC configured BWP may be accomplished by a timer or DCI, but not by RRC. The initial active DL BWP may be defined as the frequency location and bandwidth of a RMSI CORESET and numerology of RMSI (e.g., SIB1), which is no less than the BW for SS plus PBCH (i.e., SSB) or MIB. There may be an initial active DL or UL BWP pair to be valid for a UE until the UE is explicitly configured (or reconfigured) with BWP(s) during or after RRC connection establishment. The initial active DL or UL BWP is configured within the UE minimum BW for the given frequency band. It is noted that the PDSCH delivered RMSI is confined within the initial active DL BWP.

As related to RRM measurement of a BWP, the SS block for RRM can be informed, with RRM in serving cell using the cell defining SSB (BWP), regardless of which BWP is activated. The usage of the measurement gap for RRM measurement is allowed. For example, when a UE performs the measurement or transmits SRS outside of its active BWP, it is considered to be a measurement gap. The CORESET for RMSI and PDSCH carrying RMSI is confined within a certain BW (the BW that all UEs can support, for example).

For configured BWP (by RRC, for example), there are real-time L1 or L2 BWP operations, including BWP activation and deactivation, BWP switching (e.g., to default BWP), inter-BWP PDCCH scheduling of PDSCH, inter-BWP or inter-CH HARQ, etc. The default BWP is not as clearly defined. In a Pcell, it is the initial active DL BWP unless explicitly configured. In a Scell, it is always explicitly configured. It can also be reconfigured.

Figure 6:
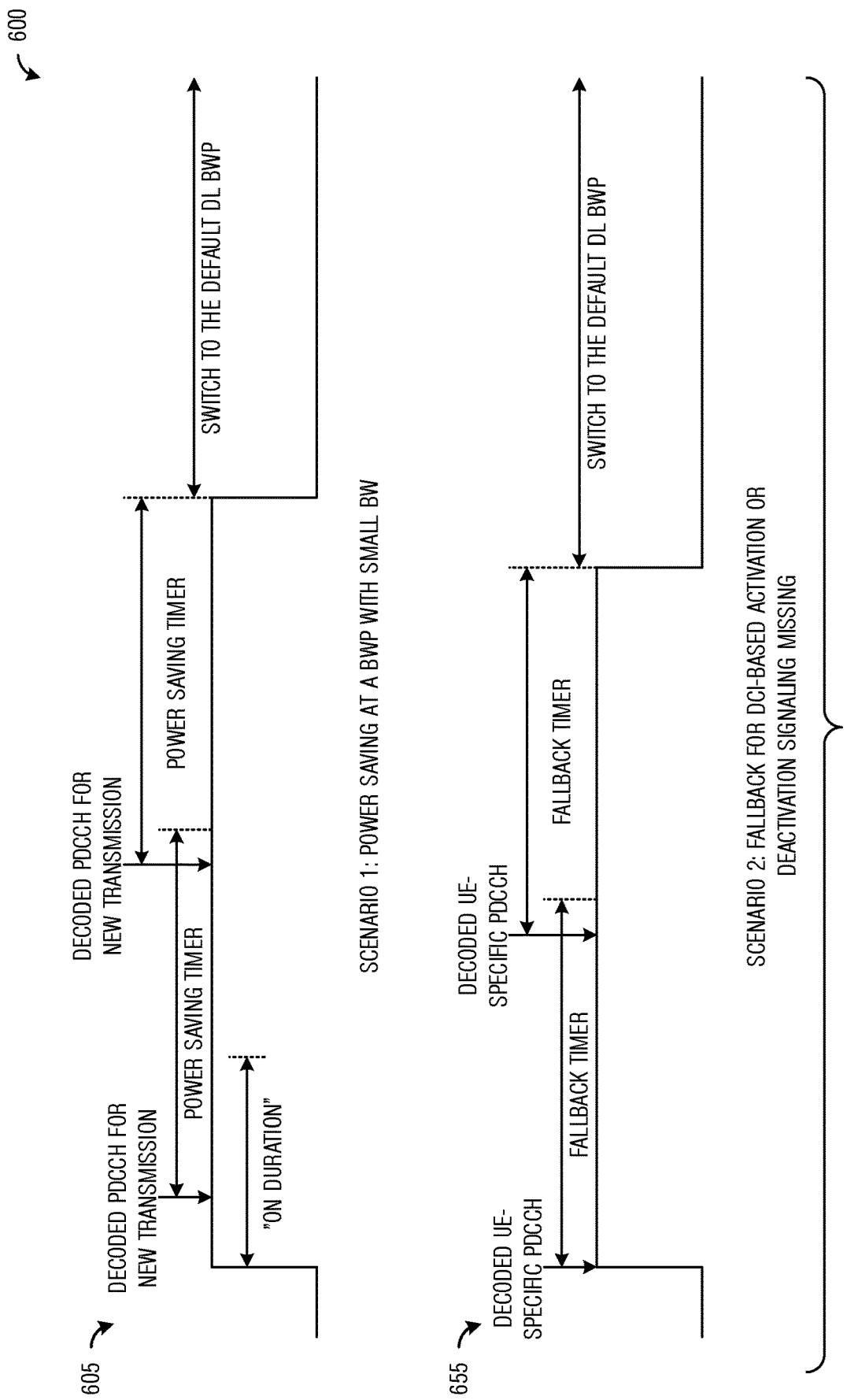
FIG. 6 illustrates a diagram of example scenarios of DCI- or timer-based active BWP switching to default BWP according to example embodiments described herein.

FIG. 6 illustrates a diagram 600 of example scenarios of DCI or timer-based active BWP switching to default BWP. As related to timer (Power saving timer) or DCI-based (with Fallback Timer) active DL BWP to default DL BWP switching (i.e., fallback), the UE supports dedicated timers (e.g., BWP-InactivityTimer for fallback, or Power saving timer) based active DL BWP switching to the default DL BWP, upon power saving timer expiry or upon fallback timer expiry. A UE starts the timer when it switches its active DL BWP to a DL BWP other than the default DL BWP. A UE restarts the timer to the initial value when it successfully decodes a DCI (in a UE-specific PDCCH) to schedule PDSCH(s) in its active DL BWP. A UE switches its active DL BWP to the default DL BWP when the timer expires.

Existing 3GPP TS 38.304 or 3GPP TS 36.304 defines NR or LTE Idle Mode or Inactive Mode and cell selection, with the "cell" and carrier frequencies and parameter scaling presented below being reconsidered with respect to "BWP":

Section 5.2.3—Cell Selection process 5.2.3.1 Description

Cell selection is performed by one of the following two procedures a) Initial cell selection (no prior knowledge of which RF channels are NR carriers);
  1. The UE shall scan all RF channels in the NR bands according to its capabilities to find a suitable cell.
  2. On each carrier frequency, the UE need only search for the strongest cell.
  3. Once a suitable cell is found this cell shall be selected.

b) Cell selection by leveraging stored information.
  1. This procedure requires stored information of carrier frequencies and optionally also information on cell parameters, from previously received measurement control information elements or from previously detected cells.
  2. Once the UE has found a suitable cell the UE shall select it.
  3. If no suitable cell is found the Initial Cell Selection procedure shall be started.

The above is similar to LTE's process, where priorities between different frequencies or RATs provided to the UE by system information or dedicated signalling are not used in the cell selection process.

For LTE (3GPP TS 36.304) or NR (3GPP TS 36.308), cell selection criterion "S" defines that a cell is selectable only if it meets below conditions $Srxlev>0$ AND $Squal>0$ where:

RSRP $Srxlev=Qrxlevmeas-(Qrxlevmin+Qrxlevminoffset)-Pcompensation$ (Pcompensate is to allow UE to avoid selecting a cell that is too far away from it in terms of its tx power capability).

$$RSRQ\ Squal=Qqualmeas-(Qqualmin+Qqualminoffset)$$

Qrxlevmin and Qqualmin are in SIB1 for cell selection, Qrxlevmin and Qqualmin are in SIB3 for candidate intra-freq. cells, or in SIB5, SIB6, SIB7, or SIB8 for candidate LTE, UMTS, GSM, or CDMA2000 inter-frequency cells.

It is noted that cell selection occurs when leaving RRC_Connected Mode (and entering RRC_Idle), the eNB may direct the UE towards a specific RF carrier by including "redirected carrier info" within RRC Connection Release, if any. Then the UE performs cell selection or reselection, camps on the (re)selected cell, and starts neighboring cell measurements and monitoring and acquiring system information. Or the UE is free to search any RF carrier.

Existing 3GPP TS 38.304 or 3GPP TS 36.304 defines NR or LTE Idle Mode or Inactive Mode and cell reselection, with the "cell" and carrier frequencies and parameter scaling presented below being reconsidered with respect to "BWP":

Section 5.2.4—Cell Reselection evaluation process 5.2.4.1 Reselection priorities handling Absolute priorities of different NR frequencies or inter-RAT frequencies_may be provided to the UE in the system information, in the RRC Connection Release message, or by inheriting from another RAT at inter-RAT cell (re)selection. In the case of system information, a NR frequency or inter-RAT frequency may be listed without providing a priority_(i.e., the field cellReselectionPriority is absent for that frequency). If priorities are provided in dedicated signalling, the UE shall ignore all the priorities provided in system information.

It is noted that the prioritization among the frequencies which UE considers to be the highest priority frequency is left to UE implementation.

The UE shall only perform cell reselection evaluation for NR frequencies and inter-RAT frequencies that are given in SI and for which the UE has a priority provided. It is noted that equal priorities between RATs are not supported.

The UE shall inherit the priorities provided by dedicated signalling at inter-RAT cell (re)selection. It is noted that the network may assign dedicated cell reselection priorities for frequencies not configured by SI.

For LTE (3GPP TS 36.304) or NR (3GPP TS 38.304), cells are picked by a "R" criterion must meet cell selectability (referred to herein as an "S" criterion) as a prerequisite. Cell reselection criterion "R" defines that, including standardized mobility state parameter scaling, For inter-frequency or inter-RAT, the priority of LTE frequency or inter-RAT frequency can be higher or lower than the current serving frequency, and "R" shall be performed differently, while SIB3 defines absolute priority for the current LTE RF carrier, and similarly SIB5~8 for other RAT carriers. For intra-frequency, the (RSRP) cell-ranking criterion Rs for serving cell and Rn for neighbouring cells is defined by:

serving: $Rs=Qmeas,s+Q\_hyst-Q\_offset-Q\_offset\_SCPTM$, and neighboring: $Rn=Qmeas,n-Q\_offset-Q\_offset\_SCPTM$.

The following CSI-RS properties for RRM measurement for L3 mobility are supported in NR:

Configurable periodicity: {5, 10, 20, 40, [80, 160]} ms are supported. This does not mean periodicity will be configured per CSI-RS resource.

Configurable transmission bandwidth are agreed upon.

Configurable measurement bandwidth and frequency location: At a least minimum carrier bandwidth for each frequency band or range and at least one additional wider bandwidth for each SCS (e.g., maximum UE bandwidth) are supported. Measurement of CSI-RS in subband or bandwidth part which may or may not contain SS Blocks is supported.

Configurable parameters for sequence generation are agreed upon.

Configurable numerology: For each frequency range, subcarrier spacing values applicable to data, CSI-RS for beam management, and SS block in the frequency range are supported.

Association between CSI-RS for RRM measurement and SS block: It is assumed that property of spatial quasi-co-location (QCL) between SS block and CSI-RS for beam management will be reused.

Configurable CSI-RS time or frequency resource: CSI-RS design including Resource Element (RE) mapping and density for beam management is assumed as baseline.

It is noted that above listed properties are relevant for RAN4 RRM measurement evaluation and are not intended to be an exhaustive list of possible properties.

Agreements of RAN1 #88bis include:

One or multiple bandwidth part configurations for each component carrier can be semi-statically signalled to a UE.

A bandwidth part consists of a group of contiguous PRBs. Reserved resources can be configured within the bandwidth part.

The bandwidth of a BWP is equal to or is smaller than the maximal bandwidth capability supported by a UE.

The bandwidth of a BWP is at least as large as the SS block bandwidth. The bandwidth part may or may not contain the SS block.

Configuration of a BWP may include the following: Numerology; Frequency location (e.g., center frequency); Bandwidth (e.g., number of PRBs).

It is noted that this is for RRC connected mode UEs.

Agreements of RAN1 #89 include:

Each BWP is associated with a specific numerology (sub-carrier spacing, CP type, etc.).

UE expects at least one DL BWP and one UL BWP being active among the set of configured bandwidth parts for a given time instant. A UE is only assumed to receive or transmit within active DL or UL BWP(s) using the associated numerology.

The active DL or UL BWP is not assumed to span a frequency range larger than the DL or UL bandwidth capability of the UE in a component carrier.

In case of one active DL BWP for a given time instance, Configuration of a DL BWP includes at least one CORESET.

A UE can assume that PDSCH and corresponding PDCCH (PDCCH carrying scheduling assignment for the PDSCH) are transmitted within the same BWP if PDSCH transmission starts no later than K symbols after the end of the PDCCH transmission.

In case of PDSCH transmission starting more than K symbols after the end of the corresponding PDCCH, PDCCH and PDSCH may be transmitted in different BWPs.

For the indication of active DL or UL BWP(s) to a UE, the following options are considered (including combinations thereof), Option #1: DCI (explicitly or implicitly).
Option #2: MAC CE.
Option #3: Time pattern (e.g. DRX like).

Agreements of RAN1 Ad Hoc #2 include:

In configuration of a BWP, a UE is configured with BWP in terms of PRBs. The offset between BWP and a reference point is implicitly or explicitly indicated to UE. Additional study includes reference point, e.g., center or boundary of NR carrier, channel number used for synchronization or channel raster, or center or boundary of RMSI BW, center or boundary of SS block accessed during the initial access, etc.

At least one of configured DL BWPs includes one CORESET with common search space at least in primary component carrier.

Each configured DL BWP includes at least one CORESET with UE-specific search space for the case of single active BWP at a given time. In case of single active BWP at a given time, if active DL BWP does not include common search space, then UE is not required to monitor the common search space.

Activation/deactivation of DL and UL bandwidth parts can be:

By means of dedicated RRC signaling. Possibility to activate in the bandwidth part configuration.

Possibility to activate in the bandwidth part configuration by means of DCI, meaning Explicit: Indication in DCI (scheduling assignment or grant or a separate DCI) triggers activation or deactivation. Where separate DCI means DCI not carrying scheduling assignment or grant.

Implicit: Presence of DCI (scheduling assignment or grant) in itself triggers activation or deactivation.

This does not imply that all these alternatives are to be supported.

For intra frequency measurements, SS block based RRM measurement timing configuration (SMTC) window duration, timing offset and SMTC periodicity are signaled in either RMSI or OSI for RRC_IDLE mode, and in RRC for RRC_CONNECTED mode. For IDLE mode, RAN2 will decide the signaling container between RMSI and OSI.

For inter frequency measurements, SMTC window duration, timing offset and SMTC periodicity are signaled per frequency, in either RMSI or OSI by the serving cell for IDLE mode, and RRC for CONNECTED mode. For IDLE mode, RAN2 will decide the signaling container between RMSI and OSI.

As related to the SS block based RRM measurement timing configuration (SMTC), i.e., measurement window periodicity, duration, or offset information for UE RRM measurement per frequency carrier:

For intra-frequency CONNECTED mode measurement, up to two measurement window periodicities can be configured. UE can be informed of which cell(s) is associated with which measurement window periodicity. For cell(s) that is not listed, longer measurement window periodicity is used, for example. Single measurement window offset and duration are configured per frequency carrier.

For IDLE mode measurements, only single SMTC is configured per frequency carrier.

For inter-frequency CONNECTED mode measurements, only single SMTC is configured at least per frequency carrier.

RAN1 asks RAN4 if there is any concern for inter-frequency measurement based on single SMTC or multiple SMTCs across different frequency carriers.

Agreements of RAN2 #99 include:

There is one NR-ARFCN per MO.

For measurements of carriers where SSB is not present (measurements performed on CSI-RS), MO includes CSI-RS resources for L3 mobility measurements, and MO includes some indication that no SSB is provided on this carrier.

For measurements of carriers where SSB is present, if SSB is not located in the centre of the carrier, then offset to the ARFCN provides the location in frequency of the SSB within that carrier. Whether the MO has only one SSB or whether the MO can include the location of more than one SSB are for further study.

Agreements above relate to a single BWP in which case the NR ARFCN would be the centre of the BWP. Case of multiple BWPs is also possible.

Include both frequency specific offset as well as cell specific offsets in MO. Offsets are for use in the event evaluation. Whether it is possible to also include cell specific offsets within the reporting configuration is for further study.

Autonomous changes to the measurement configuration are included in the spec only if necessary to avoid situations where the measurement configuration would be invalid following handover or re-establishment.

The current beam report agreements (network configures the UE to report beam identifier only, beam measurement result and identifier, or no beam reporting) applies to both event-triggered reports and periodical reports.

Agreements of RAN1 #90 include:

There is an initial active DL or UL BWP pair to be valid for a UE until the UE is explicitly (re)configured with BWP(s) during or after RRC connection is established. The initial active DL or UL bandwidth part is confined within the UE minimum bandwidth for the given frequency band.

Support activation or deactivation of DL and UL BWP by explicit indication at least in (scheduling) DCI.

Support activation or deactivation of DL BWP by means of timer for a UE to switch its active DL BWP to a default DL BWP. The default DL BWP can be the initial active DL BWP defined above.

When a UE performs measurement or transmit SRS outside of its active BWP, it is considered as a measurement gap. During the measurement gap, UE is not expected to monitor the CORESET.

Agreements from RAN1 Ad Hoc #3 include:

From UE perspective, a cell is associated with a single SS block. It is noted that the cell defining SS block has an associated RMSI. It is also noted that from the RAN1 perspective, the cell defining SS block could for example be used for common PRB indexing, scrambling, etc.

Multiple SS blocks can be transmitted within the bandwidth of a wideband carrier.

In Rel-15, for a UE, there is at most one active DL BWP and at most one active UL BWP at a given time for a serving cell.

For each UE-specific serving cell, one or more DL BWPs and one or more UL BWPs can be configured by dedicated RRC for a UE.

NR supports the case that a single scheduling DCI can switch the UE's active BWP from one to another (of the same link direction) within a given serving cell.

Agreements from RAN1 #90bis include:

The initial active DL BWP is defined as frequency location and bandwidth of RMSI CORESET and numerology of RMSI. PDSCH delivering RMSI is confined within the initial active DL BWP.

Support configuring CSI-RS resource on BWP with a transmission BW equal to or smaller than the BWP. When the CSI-RS BW is smaller than the BWP, support at least the case that CSI-RS spans contiguous RBs in the granularity of N RBs. When CSI-RS BW is smaller than the corresponding BWP, it should be larger than X RBs.

Agreements from RAN2 #99bis include:

RRC signaling support added to configure 1 or more BWPs (both for DL BWP and UL BWP) for a serving cell (PCell, PSCell).

RRC signalling support added to configure 0, 1 or more BWPs_(both for DL BWP and UL BWP) for a serving cell SCell (at least 1 DL BWP).

For a UE, the PCell, PSCell and each SCell has a single associated SSB in frequency (RAN1 terminology is the 'cell defining SSB').

Cell defining SS block can be changed by synchronous reconfiguration for PCell/PSCell and SCell release or add for the SCell.

Each SS block frequency which needs to be measured by the UE should be configured as individual measurement object (i.e. one measurement object corresponds to a single SS block frequency).

The cell defining SS block is considered as the time reference of the serving cell, and for RRM serving cell measurements based on SSB (irrespective of which BWP is activated).

RLF detection will be specified for NR in the RRC spec (as in LTE).

RLF will be based on the periodic IS or OOS indications from L1 (i.e. this is same frame work as LTE).

RRC timers and counters related to RLM are not reset when the active BWP is changed.

UE behavior on the BWP that is deactivated include:
  not transmit on UL-SCH on the BWP;
  not monitor the PDCCH on the BWP;
  not transmit PUCCH on the BWP;
  not transmit on PRACH on the BWP;
  do not flush HARQ buffers when doing BWP switching (unless an issue is identified).

RAN2 will not support MAC CE BWP switching on top of DCI.

Agreements from RAN1 #91 include:

About RLM, UE is not required to perform RLM measurements outside the active DL BWP. It is noted that RAN4 is discussing RLM requirements and need for measurement gaps.

About RRM, no change on DL or UL BWP pairing for unpaired spectrum in RAN1 #90bis and the linking between DL BWP and UL BWP sharing the same center frequency is maintained.

A UE is expected to perform CSI measurement only within its active DL BWP at the time when the measurement occurs.

Support for HARQ retransmission across DL (UL) BWPs is provided when a UE's active DL (UL) BWP is switched.

A UE is not expected to transmit HARQ-ACK if a UE's active UL BWP is switched between the reception of the corresponding DL assignment and the time of HARQ-ACK transmission at least for the paired spectrum.

Agreements from RAN2 Ad Hoc 180i include:

RAN2 understands that the SSB of the cell where Idle/inactive UE camps is the cell defining SSB.

In idle or inactive state, SI provides the UE with the common configuration that corresponds to the Initial DL and UL BWP (and no other BWPs).

Common and dedicated configuration of the Initial BWP can be provided in RRC connected. Common configuration is only provided at synchronous reconfiguration.

Other BWPs can only be configured in RRC connected.

Idle or inactive state UE monitors system information and paging information in the initial DL BWP.

Idle or inactive UE performs random access in the initial UL/DL BWP.

Initial BWP configuration as provided in system information should be the same as the common configuration of the Initial BWP configuration provided in RRC connected provided at synchronous reconfiguration.

Upon transition to the idle state, UE releases all dedicated BWP configurations (and therefore UE applies the initial BWP configuration from system information of the cell where the UE is camped).

Upon transition to the inactive state, UE applies the initial BWP configuration from system information of the cell where the UE is camped.

BWPs have no specification impact to cell selection and reselection. Cell selection and reselection is based on SSB.

UEs in connected mode monitor paging in the common search space in the active DL BWP. This is based on the assumption that common search space is provided in every DL BWP.

Agreements from RAN2 #100 include:

Monitoring of paging by the UE and SI reception by the UE is only for the NR PCell while the UE is in connected mode.

Provision of SI required for the connected mode UEs by dedicated signalling is an option for the network.

UE acquires SI broadcast required for the connected mode UE from within the UE's active BWP, if it is provided. Paging is also provided in UE's active BWP as previously agreed. If it is not provided in the UE's active BWP then the UE does not acquire SI broadcast from within that BWP. In other words, the UE does not switch active BWP autonomously for reception of SI broadcast.

Subcarrier spacing of a SSB is given in the MO.

As discussed in 3GPP TS 38.300 Sections 7.3 and 9.1 for mobility and 3GPP TS 38.311 Section 5.5 for measurement configuration, RAN agrees that BWP has no specification impact on RRM measurement, but only RS or CD-SSB has impact.

RAN2 agreements specify that RRM can be done based on CSI-RS for the active BWP, or cell-defining SSB for active or configured BWP. For RRM, each SS block frequency which needs to be measured by the UE should be configured as individual measurement object (i.e. one measurement object corresponds to a single SS block frequency). The cell defining SS block is considered as the time reference of the serving cell, and for RRM serving cell measurements based on SSB (irrespective of which BWP is activated). For a UE, the PCell, PSCell and each SCell has a single associated SSB in frequency (RAN1 terminology is the 'cell defining SSB'), which can be changed by synchronous reconfiguration for PCell or PSCell, and SCell releases or adds for the Scell (i.e., no need of handover). UEs in connected mode monitor paging in the common search space in the active DL BWP from NR Pcell. This is based on the assumption that common search space is provided in every DL BWP.

RAN1 agreements specify that CSI-based BWP measurement impacts the specifications, but no SSB based BWP impact. From the UE's perspective, a cell is associated with a single SS block. It is noted that the cell defining SS block has an associated RMSI. Additionally, the UE is not required to perform RLM measurements outside the active DL BWP. Furthermore, a UE is expected to perform CSI measurement only within its active DL BWP at the time when the measurement occurs. How CSI-RS measurement for neighboring cells can be done and used for mobility with different or multiple BWP's is for further study.

As discussed in 3GPP TS 38.300 Section 9.20 for NR cell selection and reselection, and RAN agreements for 3GPP TS 38.311 for MO, and 3GPP TS 36.304 and TS 38.304 for idle or inactive states, RAN agrees that BWPs have no specification impact to cell selection and reselection. Cell selection and reselection is based on SSB. RAN2 #96 agreements specify that for a cell or frequency that is considered for camping by UE, then UE should not be required to acquire minimum system information from other cell or frequency layer (this does not preclude reception via SFN that is under discussion in RAN1). This does not preclude the case that UE applies stored system information from previously visited cell(s). Furthermore, each cell on which UE is allowed to camp broadcasts at least some contents of the minimum system information. It should be understood that the cell defining SSB (regardless of which BWP it is on but it should be on only one BWP of the same cell or frequency layer) must broadcast (at least some contents of) the MSI, while RAN1 agreed "The cell defining SS block has an associated RMSI" too.

A question arises about when a UE goes to idle or inactive state, it releases all dedicated BWP configurations, how does the UE obtain the numerology (needed for SSB, for example) or BW (not needed for SSB) for cell selection or reselection from SI?

The BWP concept raises a lot of mobility and measurement related questions. For example, prior arts fail to address the concern that BWP measurement is more accurate than SSB based RRM measurements, if the mobility or "cell" (BWP) selection will eventually incur BWP-level operations. Core questions include which BWP to measure, how to measure, and how to compare the measurements in RRM, S, or R criterion?

Using RRM for example, for the existing three BWP usage scenarios, are existing measurement schemes applicable directly? As an example, if RRM is cell-specific and based on a narrow-band (CD-)SSB, then how can the UE select or handover to a specific target BWP when multiple BWPs exist in a cell of wideband carrier? For RRC_Connected mode, UE is configured with multiple BWP's and their numerology. How to measure and compare BWPs as the target serving BWP for this UE? For RRC_Connected mode, how to compare RRM measurements (if BWP's are of different bandwidths, numerologies, or central frequencies) for neighbor cells, or in a same cell but for inter-BWPs? For RRC_IDLE or RRC_Inactive mobility in SA NR, does a UE camping on a CD-SSB see only the initial BWP during cell reselection (based on SIB1~SIB3)? Does the initial BWP necessarily cover CD-SSB?

Figure 7:
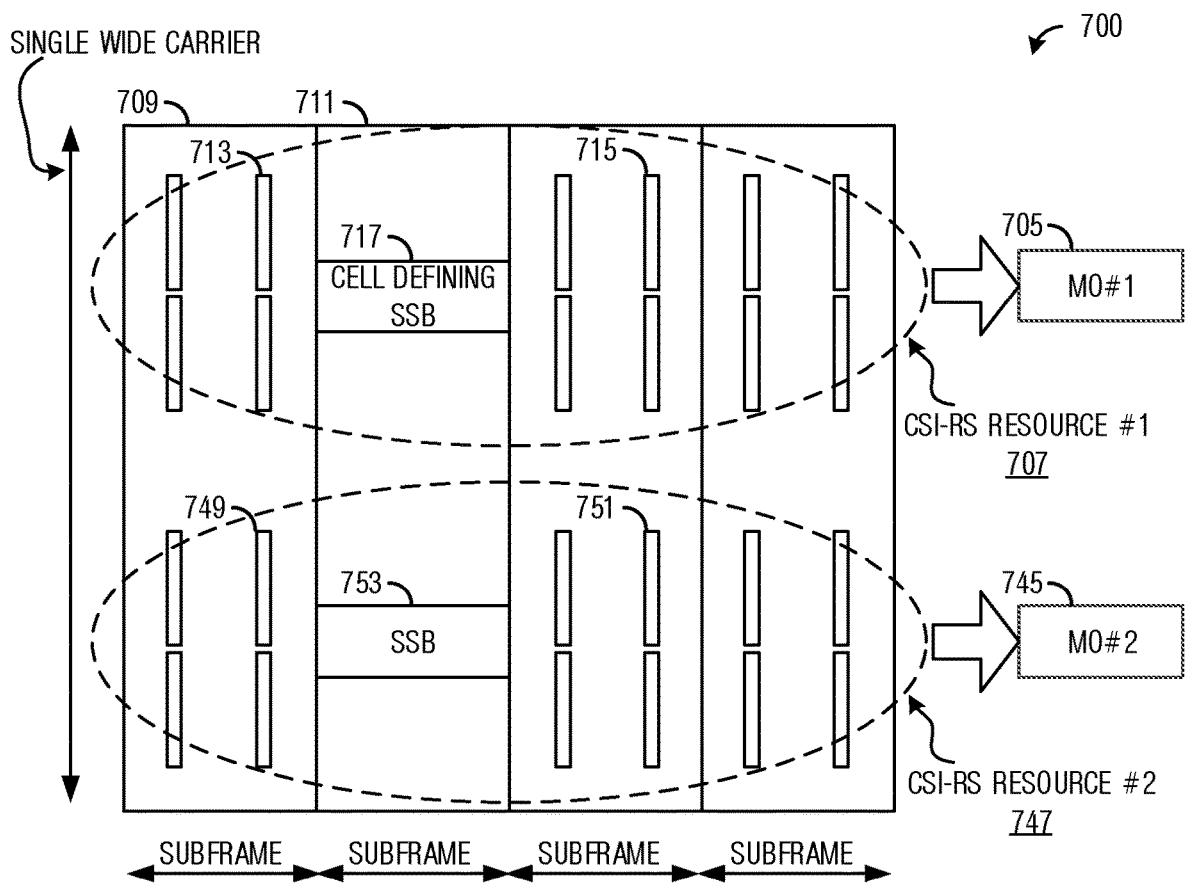
FIG. 7 illustrates a diagram of measurements of SSB frequencies as specified by different MOs according to example embodiments described herein.

FIG. 7 illustrates a diagram 700 of measurements of SSB frequencies as specified by different MOs. In a first MO 705, CSI-RS resource 707, which includes multiple subframes, such as subframes 709 and 711, is measured. CSI-RS resource 707 includes network resources, such as resources 713 and 715, as well as a CD-SSB 717. In a second MO 745, CSI-RS resource 747, which also includes multiple subframes, such as subframes 709 and 711, is measured. CSI-RS resource 747 includes network resources, such as resources 749 and 751. However, CSI-RS resource 747 includes a SSB 753 rather than a CD-SSB.

According to an example embodiment, a uniform UE measurement framework and a mobility scheme for handover, "S", or "R" criterion are provided. The uniform framework and mobility scheme applies to both inter-cell or inter-BWP mobility, and BWP selection in a wideband carrier cell or among neighboring cells.

According to the embodiment, BWP parameters that are signaled (implicitly by RSs between a UE and network entity or explicitly by RRC or SI signaling) may be utilized to scale measurements (such as RSRP, RSRQ, SINR, SNR, RSSI, and so on) similar to mobility speed scaling of measurements. Hence, it is possible to derive a hierarchical handover or (re)selection scheme to harmonize the cell or BWP level decisions and reduce handover ping-pong behavior due to inconsistent measurements of cell vs. BWP level channel quality. Examples of BWP parameters include BWP bandwidth, BWP subcarrier spacing (SCS), cyclic prefix (CP), central frequency, and so on.

NR supports a measurement of "BWP-specific" RS based on configuration for inactive candidate BWPs or BWPs in neighboring cells, similar to CSI-RS based RRM or active BWP measurement. The "BWP-specific" RS can be a BWP-specific SSB, which is associated with the BWP, or a RS covering BWP's full-BW frequency, time, or space scope in the same numerology. The "BWP-specific" RS can be always-on or dynamically on-off. A non-serving or serving BWP can be network configured, either by explicit signaling in MO, or implicitly by a RS that covers BWP's frequency scope, numerology, etc. (e.g., by the CSI-RS for active BWPs only, or by a SSB, etc.).

According to a first example embodiment, a new mobility scaling scheme and metric based on target BWP parameters is provided. In the first example embodiment, mobility and RRM in RRC_Connected (or by selection (S) or reselection (R) criterion) for intra-frequency, inter-frequency, or IRAT scenarios, the scaling parameters include BWP numerology, BW, SCS, CP, or the central frequency (e.g., NR-ARFCN or EARFCN), etc. For example, measurement metrics (e.g., RSRP or its threshold) of a RS or SS can be scaled by BWP BW, to differentiate RSRP received over a narrow-band RS or BWP vs. that over a wide-band RS or BWP. For example, for intra-frequency or inter-frequency mobility or BWP switching among same-numerology BWP's, adopt similar equal-opportunity cell ranking of RSRP, RSRP comparison, or RSRQ comparison, or their combination, but RSRP is scaled by BWP parameters, such as BW, e.g., (RSRP*BW_of_BWP), for "BWP-level" measurement and mobility.

As an example, a target BWP has a better signal quality (e.g., RSRP) but a smaller bandwidth. In such a situation, should the UE handover onto the target BWP? As another example, a target cell has a better signal quality (e.g., RSRP), but the UE will have a smaller bandwidth BWP if the UE handovers onto the target cell. In such a situation, should the UE participate in the handover? What if the UE later finds out that its throughput drops after the handover? As another example of this embodiment, in RRC_Idle mode mobility or UE-based mobility (e.g., the forward handover in RRC_Connected mode) that triggers "S" or "R" criterion for cell (or likely BWP) selection and reselection, the channel measurements can also be scaled in the same way as for RRC_Connected state RRM and mobility proposed earlier. As yet another example of this embodiment, any BWP-related mobility defined for the new RRC_Inactive state (introduced in 3GPP R15) may also be handled in the same way. In short, although different embodiments may scale the same or different signal quality metrics using the same or different (combinations of) BWP parameters, they naturally fall into the same category of our invention.

According to a second example embodiment, a hierarchical, multi-level (i.e., harmonized cell-level and BWP-level) measurement and mobility scheme is provided. As an example, the second example embodiment comprises three steps: a first step occurs at cell-level then a second step occurs at BWP-level, lastly, in a third step, the two levels interact for harmonized results. For example, the first step is the legacy rough measurement (e.g., RSRP) based on cell-specific RS (e.g., "cell-defining" SSB for inactive or idle state UE, or a SSB associated with an inactive BWP's) to derive cell-level mobility decisions; the second step is to measure a BWP-specific RS (e.g., for RSRP) for UE in the serving or selected cell(s), e.g., as configured in MO, or scale previous (rough) measurements with explicitly configured BWP parameters; Lastly the third step refines Step 1 decisions on mobility HO (active state) or cell selection or reselection (for idle or inactive state), or combine the Step 1 and 2 results sequentially, iteratively, or recursively, etc., to harmonize cell and BWP level decisions, and avoid ping-pong of mobility decisions. Also provided are the adoption of scaling in R or S criterion at the BWP level. The criteria are configured by BWP-configuration. The framework, scheme, and criterion are compatible with existing cell-level mobility solutions. Furthermore, the framework, scheme, and criterion are used to select a target BWP in the same cell of a wideband carrier or among neighboring cells. The selection of a target BWP does not conflict with the selection of the cell. In other words, the selected BWP falls into the selected cell. Otherwise, there may be a ping-pong condition where the selected target cell may not have a better BWP for serving the UE than the source cell or BWP, and hence the UE continuously selects the original source cell or BWPs after it already switches over to the selected target.

Figure 8:
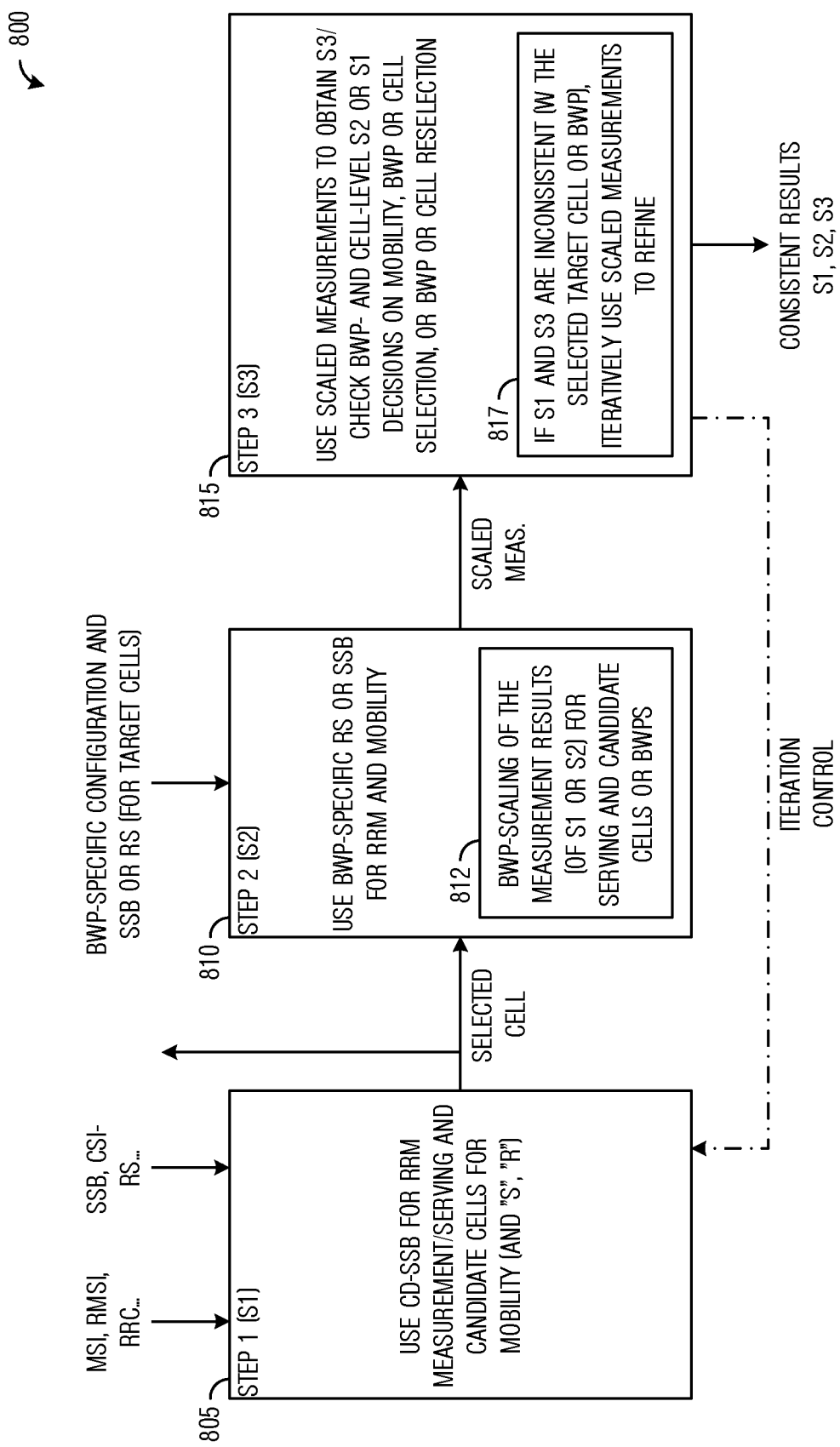
FIG. 8 illustrates a flow diagram of a high-level view of example operations occurring at a UE performing measurements and mobility according to example embodiments described herein.

FIG. 8 illustrates a flow diagram of a high-level view of example operations 800 occurring at a UE performing (BWP-scaled) measurements and (UE-based) mobility. Operations 800 may be indicative of example operations occurring at a UE as the UE performs measurements and mobility. Operations 800 highlight an example embodiment where the UE makes the mobility decisions (i.e., UE-based mobility such as a forward HO or a cell selection and reselection). In other example embodiments, the network makes the mobility decisions, prior to which the UE sends measurement reports to the network so that the network can make a mobility decision and send information about the mobility decisions to the UE. In other example embodiments, the network makes partial mobility decisions and the UE makes the other mobility decisions. As an example, the UE makes cell level mobility decisions and the network makes BWP level mobility decisions.

In a first step, operations 800 begin with the UE making cell-level measurements (block 805). As an example, the UE uses reference signals, such as CD-SSBs or CSI-RSs transmitted by neighboring cells (e.g., serving cell and one or more candidate cells), to make cell measurements. The cell measurements may be used for cell-level mobility decisions, as well as S or R decisions. The UE may make use of information, such as broadcasted minimum scheduling information (MSI), remaining minimum system information (RMSI), unicasted RRC messages, and so on, as well as the reference signals, to make the cell measurements.

A cell selected or reselected in the first step is provided to a second step, where the UE utilizes BWP specific information for RRM or BWP measurements (block 810). As an example, the UE uses BWP reference signals, such as BWP-specific RS or BWP-specific SSB, to make BWP measurements. As part of the second step, the UE performs scaling of measurements (block 812). As an example, the UE scales a cell measurement made in the first step using a BWP parameter. As another example, the UE scales the BWP measurement made in the second step.

The scaled measurements determined in the second step are provided to a third step, where the UE uses the scaled measurements to obtain mobility decisions (block 815). The scaled measurements, e.g., scaled cell measurements or scaled BWP measurements, may be used to make the mobility decision, which may be a cell level mobility decision, a BWP level mobility decision, or both a cell-level and a BWP-level mobility decision. The UE also refines the mobility decision, if needed, to help prevent the ping-pong effect (block 817). As an example, if the results of the first step and the third step are inconsistent, with respect to the selected cell or BWP, for example, the UE may sequentially, iteratively, selective, or recursively perform the first to the third steps to harmonize the mobility decisions. As another example, if the harmonization of the mobility decisions is needed, the UE may assert an iteration control line from the third step to initiate and control the sequential, iterative, selective, or recursive performance of the first and second steps. Harmonization of the mobility decision may involve the sequential, iterative, selective, or recursive execution of the first and second steps or the third step to fine tune the mobility decisions to prevent the ping-pong effect. Throughput the discussion, the terms harmonization and refinement are used interchangeably, application of which results in consistent mobility decisions at cell and BWP levels to avoid or minimize ping-pong effects.

Examples of the harmonization process include: the UE may determine that the cell level mobility decision made in the first step results in a worse or more limiting BWP-level mobility decision made in the third step, and hence instructs the first step to make another cell selection, and the second step to make additional BWP measurements, as well as scaling of the measurements, by assertion of the iteration control line, for example. After the first step makes another cell selection, the second step and the third step may be performed automatically. Harmonized mobility decisions are provided as output of the third step. As another example, the first step may select neighboring cells 1 and 2 as the potential target cell(s) for handover based on CD-SSB based measurements of RSRP or RSRQ, and the second step scales the measurement results with signaled BWP parameters in serving and target cells. However, the third step may find that based on such scaled measurements, only one of the cells 1 or 2 is "better" than the original serving cell at the BWP level (by comparing the scaled metrics, for example) or even neither of them, because the cells 1 or 2 may only have a very small-BW BWP when compared to the source cell or source BWP, or very low channel quality in the target BWP(s) when compared to the CD-SSB. In such cases, harmonization can be triggered—the mobility decision will be refined by reverting back from the third step to the first step again, which will rule out the target cells determined by the previous third step as worse than the serving cell (at the BWP level), and then sequential steps may execute iteratively as before.

In an embodiment, the steps of operations 800 may be merged into a single step, where all or substantially all possible candidate cells and BWPs in the vicinity of the UE may be measured and scaled.

Figure 9A:
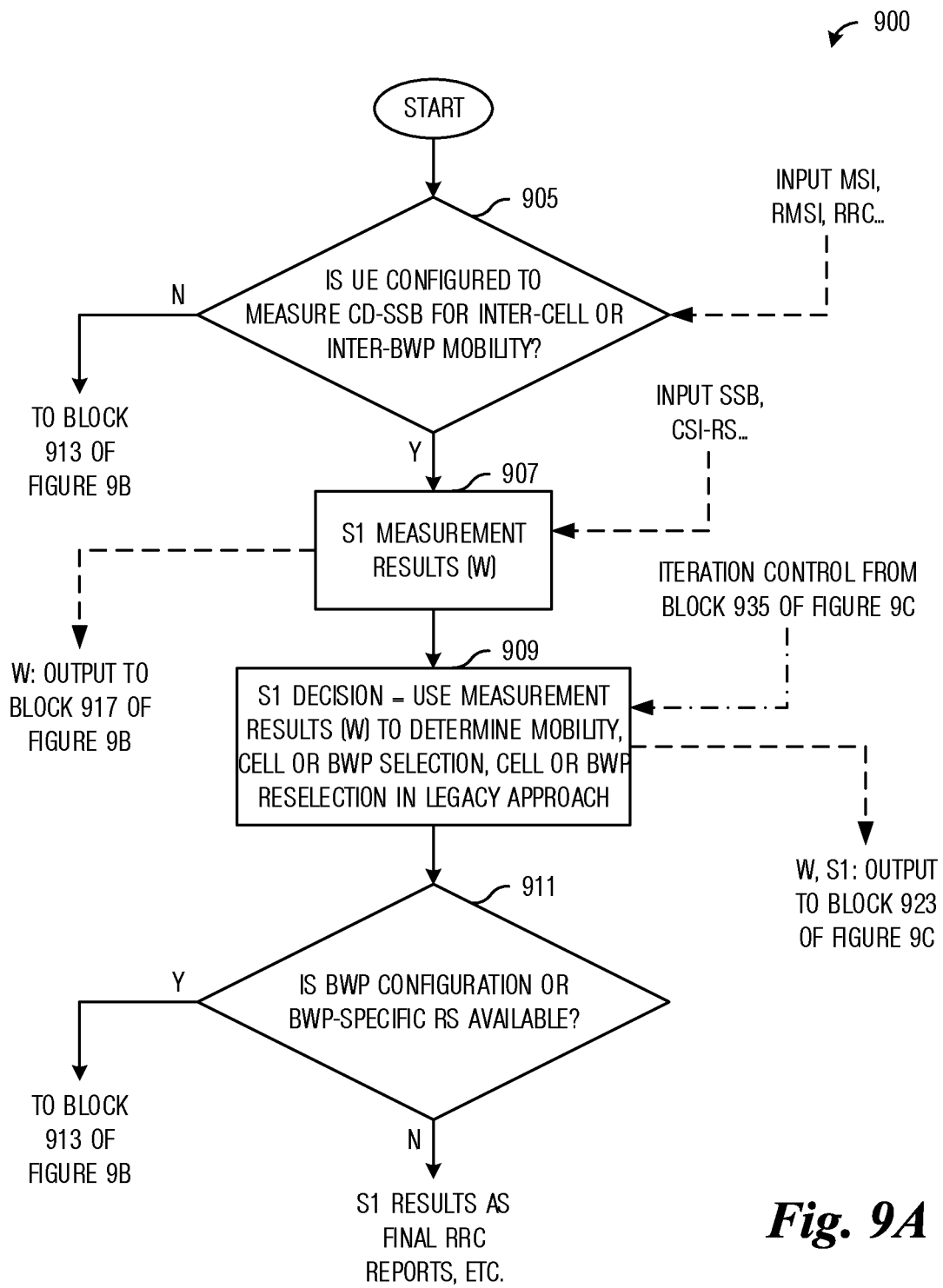
FIGS. 9A-9C illustrate flow diagrams of a detailed view of example operations occurring at a UE performing measurements and mobility according to example embodiments described herein.
Figure 9B:
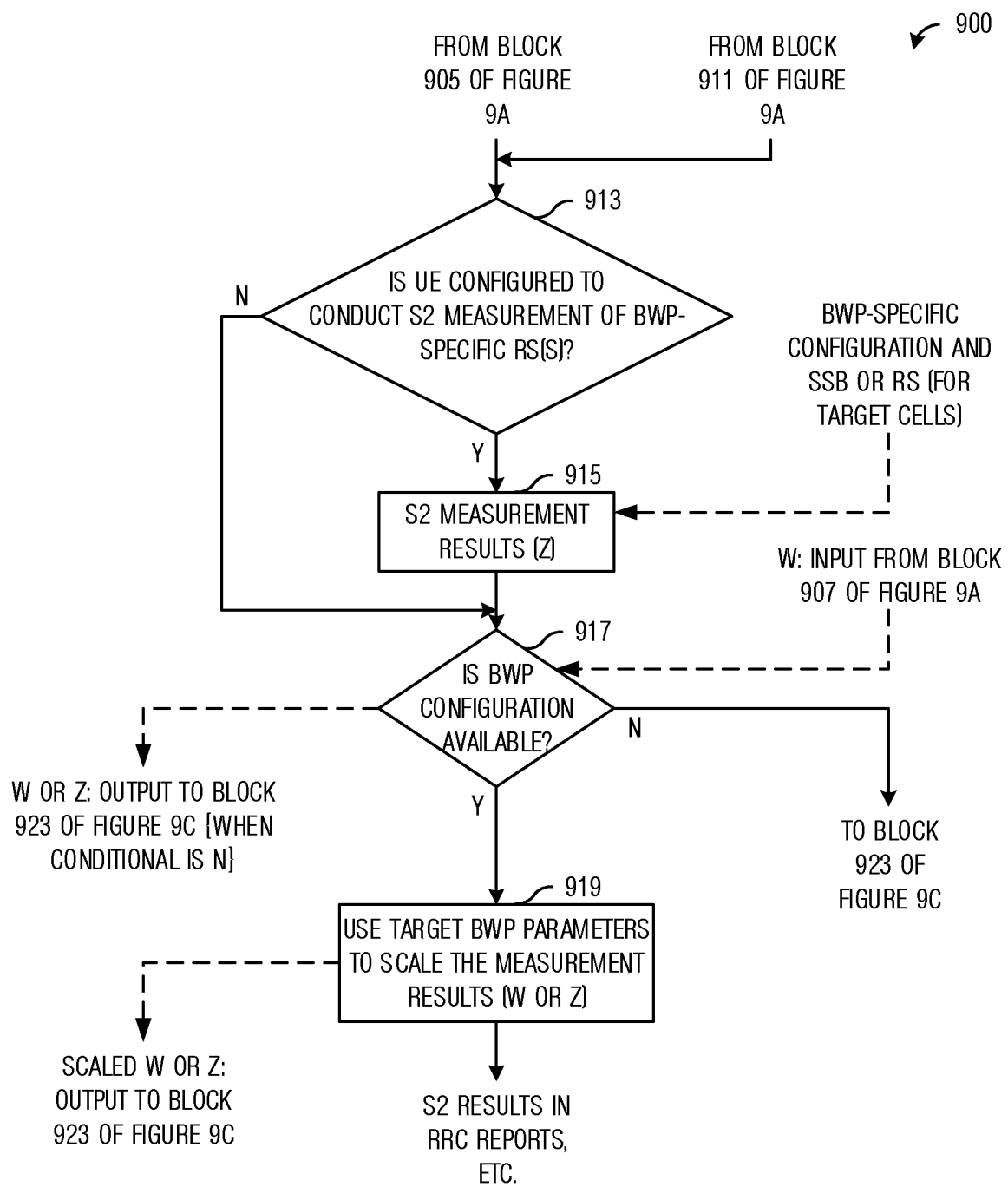
Figure 9C:
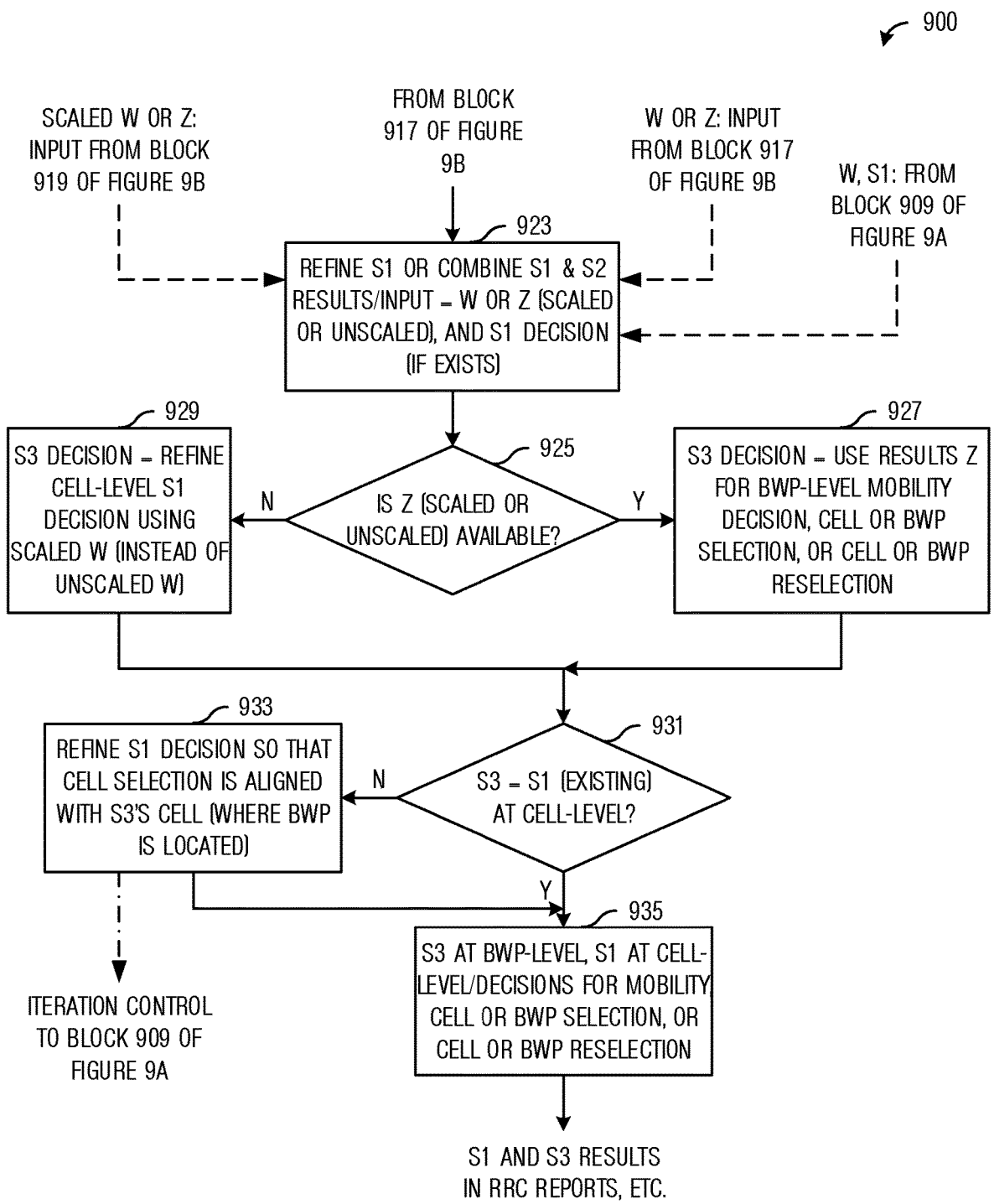

FIGS. 9A-9C illustrate flow diagrams of a detailed view of example operations 900 occurring at a UE performing measurements and (UE-based) mobility. FIGS. 9A-9C highlight example embodiments, with multiple example embodiments for S1 decision refinement, such as S1 selection correction as a cell where S3 prefers (i.e., where S3's BWP locates). Operations 900 highlight an example embodiment where the UE makes the mobility decisions. In other example embodiments, the network makes the mobility decisions. In such example embodiments, the UE sends measurement reports to the network and the network sends information about the mobility decisions to the UE. In other example embodiments, the network makes some mobility decisions and the UE makes some mobility decisions cooperatively. As an example, the UE makes cell level mobility decisions and the network makes BWP level mobility decisions, or vice versa. As shown in FIGS. 9A-9C, input data or output data are represented as dashed lines, while solid lines represent movement between processing and decisions of example operations 900.

Operations 900 begins with the UE performing a check to determine if it is configured to measure reference signals for mobility (block 905). As an example, the UE may be configured to measure CD-SSBs for inter-cell or inter-BWP mobility. In addition to the CD-SSBs, the UE may also measure BWP specific SSBs, CSI-RSs, and so on. If the UE is not configured to measure reference signals for mobility, the UE attempts to perform step S2 measurements, which are denoted Z. A detailed discussion of the step S2 measurements is provided below.

If the UE is configured to measure reference signals for mobility, the UE makes measurements of the reference signals (block 907). The measurements of the reference signals are referred to herein as step S1 measurement results, or simply W. The UE uses the step S1 measurement results (W) to perform mobility (block 909). The mobility performed by the UE utilizing W may include cell or BWP level handover, cell or BWP selection, or cell or BWP reselection. As an example, the UE uses legacy mobility processes or techniques to perform cell or BWP selection, or cell or BWP reselection. Note that the scaling of measurements or mobility decisions based on BWP parameters does not exist in the legacy process or techniques.

The UE performs a check to determine if a BWP configuration or a BWP-specific reference signal is available (block 911). If neither the BWP configuration nor the BWP-specific reference signal are available, the UE initiates the mobility determined in block 909. Alternatively, the UE reports the mobility determined in block 909 to its source access node. Alternatively, the UE initiates the mobility determined in block 909 and reports the mobility to its source access node.

If either the BWP configuration or the BWP-specific reference signals (or both) is available, the UE attempts to perform step S2 measurements. The UE performs a check to determine if it is configured to measure BWP-specific reference signals (block 913). If the UE is configured to measure BWP-specific reference signals, the UE makes measurements of the BWP-specific reference signals (block 915). The measurements of the BWP-specific reference signals are referred to herein as step S2 measurement results, so simply Z.

After measuring the BWP-specific reference signals (block 915) or if the UE is not configured to measure the BWP-specific reference signals, the UE performs a check to determine if a BWP configuration of a target access node is available (block 917). The BWP configuration may have been provided to the UE by the source access node, for example. If a BWP configuration is available, the UE uses one or more of the BWP parameters of the BWP configuration of the target access node to scale the measurement results (block 919). The UE may scale the step S1 measurement results (W) using one or more of the BWP parameters. If the step S2 measurement results (Z) are available, the UE may scale the step S2 measurement results (Z) using one or more of the BWP parameters. The UE may scale both the W and the Z using one or more of the BWP parameters. In such a situation, the same BWP parameters may be used to scale both the W and the Z. Alternatively, different BWP parameters may be used to scale the W and the Z.

The UE refines the mobility results first by taking inputs from the first step and the second step results (block 923). The UE may refine the step S1 results, e.g., selected target cell(s) (e.g., cells 1 and 2) based on the W, the Z, or both the W and the Z. The UE may utilize the scaled or unscaled W, Z, or both W and Z to refine the results, for example. Additionally, if the mobility determined in block 909 is available, the UE uses the mobility determined in block 909 to refine the results. If the inputs of W are not scaled in the first step, then the decision in the first step may not necessarily be accurate because the target cell(s) (e.g., cells 1 and 2) are selected based on CD-SSB, for example, which does not reflect different target BWPs' bandwidth or even frequency locations between the target cell(s) and the original source (serving) cell. Therefore, the second step's scaled measurements considering BWP parameters can be applied to derive better mobility decisions in the third step (e.g., blocks 923, 925, etc.). Alternatively, the UE may refine both the step S1 measurement results and the step S1 mobility results in the second and third steps, or in the third step. Alternatively, the UE may combine the step S1 and the step S2 measurement results, i.e., the UE may combine W and Z to recalculate the mobility decision to determine the right target cells or target BWPs or both in the third step. As discussed before, an iteration (or recursion, repeating, etc.) of the first through third steps may take place to harmonize the BWP- and cell-level mobility decisions to avoid the potential ping-pong effect.

The UE performs a check to determine if the step S2 measurement results (Z) are available (block 925). The step S2 measurement results (Z) may be scaled or unscaled. If the step S2 measurement results are available, the UE determines the step S3 mobility in accordance with the step S2 measurement results (block 927), which may derive better mobility decision because Z may be more accurate than W because Z is based on the (target) BWP-specific RSs may at least have a more aligned central frequency with the target BWP than the cell-specific RSs (e.g., CD-SSB). The step S3 mobility may include a BWP level mobility decision, a cell or BWP level selection, or a cell or BWP level reselection, for example, for different mobility or RRC states. If the step S2 measurement results are not available, the UE determines the step S3 mobility in accordance with the S1 measurement results (block 929) where the step S1 measurement results (W) may have been scaled in the second step block 919, or not in the second step block 917. The step S3 mobility may be determined in accordance with the scaled S1 measurement results. The step S3 mobility decision process may be a refined version of the S1 mobility decision process, wherein the refinement is in accordance with the scaled S1 measurement results, or BWP-specific (scaled or not) S2 measurement results, or combinations of step S1 and step S2 results.

The UE performs a check to determine if the step S1 mobility and the step S3 mobility are equivalent (block 931). Equivalency of the step S1 mobility and the step S3 mobility may be at the cell level, for example. In other words, the UE is performing the check to determine if the decisions from S1 and S3 mobilities are associated with the same cell(s), e.g., target cell(s). If the step S1 mobility and the step S3 mobility are not equivalent, the UE refines the step S1 mobility (block 933) to avoid any future ping-pong effects. The refinement of the step S1 mobility may include the reselection of the step S1 mobility target cell(s) so that the cell(s) from the step S1 mobility is aligned with the target cell(s) of the step S3 mobility, for example. In other words, the cell(s) hosting the selected target BWP(s) associated with the step S3 mobility are consistent with the selected target cell(s) of the step S1 mobility. Refinement of the step S1 mobility may include a repeating of (any combinations of) the steps S1, S2, and S3 processes, an iterating of (any combinations of) the steps S1, S2, and S3 processes, or a recursion of (any combinations of) the steps S1, S2, and S3 processes. The repeating, iterating, or recursion of (any combinations of) the steps S1, S2, and S3 processes may be initiated by asserting a first value on an iteration control line, for example.

If the decisions from step S1 mobility and the step S3 mobility are equivalent, or after refinement of the step S1 mobility, the UE initiates the steps S1 and S3 mobility (block 935). The steps S1 and S3 mobility may include handover, selection, or reselection at either cell level or BWP level or both for different RRC states. Alternatively, the UE reports the step S1 mobility or the step S3 mobility, or both mobilities, decision and measurement results to its source or its newly selected access node. Alternatively, the UE initiates the steps S1 and S3 mobilities and reports the step S1 or step S3 mobilities, or both mobilities to its source or its newly selected access node.

According to an example embodiment, scaled channel metrics are used to enable more accurate comparisons. The channel metrics, such as RSRP, and the like, may be scaled by BWP-parameters. The scaling may be applied to a SSB measurement or paging RS measurement to treat candidate BWPs differently from candidate cells. The scaling may also be applied to accurately measure the BWPs or cells despite their (cells or BWPs) being configured (as SA or NSA) or active (as serving or neighboring).

The scaling also enables a more accurate consideration of the configured BWP parameters or BWP-specific RSs, which allows for the prioritizing and measuring of new BWP-specific RSs (covering the candidate BWPs' frequency BW domain, (NR-)ARFCN, in a same numerology, for example) in BWP-level mobility operation. Furthermore, the scaling also enables a more accurate consideration of the configured BWP parameters or BWP-specific RSs to measure the associated CD-SSBs or paging RSs (with SFN, ARFCN, PCI, and so on), and scale them with the BWP's parameters of reference frequency (ARFCN), BW, or numerology (it is noted that different numerologies imply inter-RAT). Additionally, the scaling also allows for the normalization of channel metrics, including:

RSRP=function (RSRP, BWP parameters), e.g., =RSRP*BW_of_BWP, when utilizing RSRP in mobility or "S" or "R" criterion;

Scale its offset, absolute thresholds, +/− hysteresis similarly; The above scaling applies unanimously to both candidate or neighboring cells, candidate BWPs within the same cell, or candidate BWPs among neighboring cells in order to have fair comparisons; or other channel (CH) metrics whenever applicable.

According to the embodiment, the BWP-specific RS or the configuration of BWP parameters (e.g., in MSI or RRC connection configuration, MO or report configuration, or in paging related RMSI or SIB) is usable not just for active BWP measurement (e.g., like CSI-RS), but also for non-active BWPs or BWPs in neighboring cells or carriers. The BWP-specific RS in step S2 may be:

a BWP-specific SSB or a SSB located within BWP's frequency domain;

a full-BW CSI-RS in BWP's frequency domain;

any RS that covers the same BW and numerology of BWP;

any RS that is considered as associated to the BWP, or in other words its channel property tightly correlates to BWP's channel property; or the CSI-RS for active BWP, but less dependent on UE's RRC states but more like an always-on or on-demand RS.

In a situation where the BWP-specific RS does not exist, or BWP refers to a whole-BW carrier, and BWP-specific parameters are not configured, then step S1-S3 reduces to using a S1 cell-specific RS or the cell-defining SSB, then the framework would reduce to the existing cell defining SSB-based measurement or mobility scheme.

When the step S2 scales the CH metrics using BWP parameters or calibrates the CH measurement using BWP-specific RSs, the scaling parameters include at least the BWP's numerologies, BW, or central frequencies (such as NR-ARFCN or EARFCN, etc.), for example, associated with the serving or target BWP or cell. For example, the SSB measurement metrics (RSRP and its threshold) for RRM, "S" (cell selection), or "R" (cell reselection) can be scaled by BWP BW to derive a uniform metrics that are comparable among all neighboring cells (regardless of serving or target BWP's difference, etc.). As an example, scaling is performed using RSRP's BW on the RSRP threshold for cell reselection, with the BWP's BW being used to differentiate, for example, for intra-frequency or equal-opportunity inter-frequency cell reselection (and BWP operation), the RSRP received a narrow-band vs. the RSRP received over a wide-band BWP.

Between the same numerology same carrier BWPs, follow the equal opportunity BWP ranking of RSRP or RSRQ, but the "BWP" ranking is still R_s<=R_n, but the R_s or R_n in our proposal is the RSRP scaled by BWP's BW, e.g., (RSRP*BW_of_BWP) in serving or target or neighbor BWPs, respectively.

Otherwise: follow the inter-frequency or IRAT absolute-priority based "R" criterion with scaling likewise.

The scaling function (RSRP, BWP parameters) may vary logically in different embodiments, for example, instead of multiplying RSRP by BW_of_BWP, they can be summed, linearly combined, proportionally weighted, and so on.

The BWP parameter signaling may be performed explicitly through either dedicated RRC signaling (such as in MO or measurement report in 3GPP TS 38.331 or 3GPP TS 38.300), or SI broadcasts (such as in SIB1 or RMSI), or implicitly by UE's measurement of BWP-specific target measurement RSs.

According to an example embodiment, where UE-based mobility is adopted as shown in FIGS. 9A-9C, a hierarchical measurement framework and mobility scheme using BWP-level measurement scaling to derive normalized CH metrics (or similarly, measurement gap) for intra-frequency, inter-frequency, or inter-RAT mobility in different RRC states is provided. The hierarchical measurement framework and mobility scheme involves steps S1 and S2 inputs (as shown in FIGS. 9A-9C, for example), and then combines the normalized CH metrics with initial step S1 and S3 decisions hierarchically (e.g., iteratively, recursively, or any sequential or selective combinations among steps S1 through S3), for final decisions in "S", "R", or mobility. As configured, step S1 measure a cell-specific RS (such as, the "cell-defining" SSB) to obtain a coarse results of "cell" quality for mobility decision (cell selection, reselection, or HO). Then, for the S1 selected cells or for candidate cells, the "BWP-specific" RS or BWP configuration parameters, if any (e.g., used for scaling as sub-proposal 1), with higher priority to scale or refine the channel measurements at the BWP-level are used. Then, step S3 derives the final mobility results at both the BWP-level and the cell-level as sub-proposal 2 in a hierarchical manner (e.g., sequentially, iteratively, or recursively repeating or selectively combining the first two steps S1 and S2, and initial step S3 results) resolving any potential cell vs. BWP-level ping-pongs, or any conflicts between cell-level and BWP-level initial decisions.

The hierarchical measurement framework and mobility scheme makes sure that the cell-level and BWP-level handover or "cell" (re)selections are consistent. Cell level selection of the target should be consistent with BWP-level selection, e.g., target BWP in step S3 falls into target cell in step S1; target BWP in step S3 is of better CH metrics than source BWP in step S1, scaled or not, or other candidate BWPs.

If the cell-level and BWP-level handover or "cell" (re) selection are not consistent, the results of steps S1 and S3 are harmonized based on their measurements, as well as measurements of step S2 and BWP-scaled metrics, to satisfy the "S", "R", or mobility criterion at both BWP and cell level. It is noted that the BWP-level decision may be of higher priority (e.g., overwriting) or weight (e.g., combining) than the cell-level decision, where the combining methods can be multiple operations (e.g., linear sum, weighted fair, etc.); or vice versa (e.g., BWP-level decision can only be made based on step S1 decisions, i.e., out of step S1-selected target cells). It is noted that if neither BWP configuration nor BWP-specific RS exist, step S2 reduces to null, steps S1 and S3 derive same decision, and essentially the example embodiments reduce to legacy cell-level mobility scheme.

According to an example embodiment, BWP-specific measurement reports and mobility decision reports are reported to network side entities. The measurement reports may be scaled, by the BWP parameters, for example. Reports of cell-level legacy measurements based on SSB are sent to network side entities. Reports of any BWP-specific measurements are configured. Reports of mobility, cell or BWP selection, and cell or BWP reselection decisions are sent to network side entities after harmonization of the UE-side decisions at both the cell-level and the BWP-level. Note that this example embodiment is for UE-based mobility, i.e., the decisions involves UE-side selection or reselection or determination of target cell or BWP. In another embodiment, network-based mobility is performed, where the network makes decisions based on UE-side reports, or UE- and network joint decisions of mobility, the hierarchical decision mechanisms based on BWP scaling are still applicable.

Figure 10:
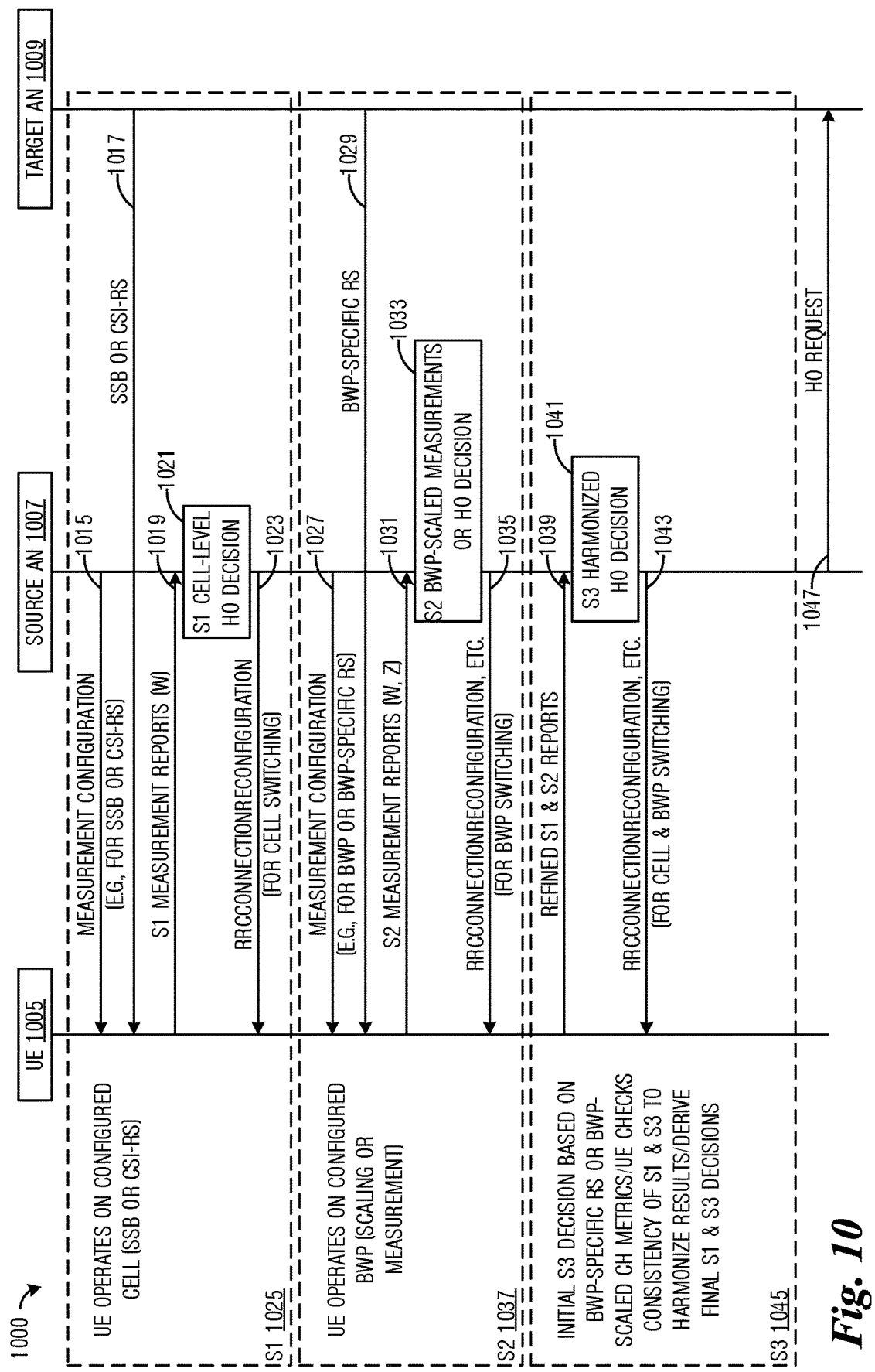
FIG. 10 illustrates a diagram of operations at and communications between devices performing measurements and mobility according to example embodiments described herein.

FIG. 10 illustrates a diagram of operations 1000 occurring at and communications between devices performing measurements and mobility. The devices include a UE 1005, a source AN 1007, and a target AN 1009. Other devices may also participate. In different embodiment, steps and message formats may vary, ordering of messages and operations may be changed or shuffled, steps and messages may be merged, split, or coordinated differently. As an example, steps S1 through S3 may be executed independently, partially, completely omitted, merged, or combined (in a two by two or all three manner, for example). As another example, steps S1 through S3 may be performed hierarchically (e.g., sequentially, selectively, interactively, recursively, and so on) in a coherent manner. Multiple approaches may be taken to check the consistency of steps S1 and S2. Corresponding to the consistency checking performed at the cell-level (step S1=step S3, for example) between steps S1 and S3, as shown in FIGS. 9A-9C, other consistency checking approaches may include assuming that the target BWP is necessarily better than the source BWP using a (scaled) CH metric in the mobility criterion (which is shown in step S3 of FIGS. 9A-9C, for example). The consistency checking may be at the UE-side as well as the network-side.

FIG. 10 presents another example embodiment for network-based mobility. Source access node 1007 sends a measurement configuration to UE 1005 (event 1015). The measurement configuration may include configuration information for a cell-specific reference signal, such as a SSB or CSI-RS, associated with target access node 1009, for example. Target access node 1009 transmits the cell-specific reference signal (event 1017). UE 1005 receives the cell-specific reference signal, and makes measurements in accordance with the cell-specific reference signal. The measurements are referred to as step S1 measurements (W). UE 1005 sends a measurement report to target access node 1007 (event 1019). The measurement report includes the step S1 measurements, for example. Source access node 1007 makes a cell-level mobility decision (block 1021). As an example, source access node 1007 makes a cell-level handover decision. Source access node 1007 initiates the cell-level mobility decision (event 1023). As an example, source access node 1007 sends an RRCConnectionReconfiguration message to UE 1005. Collectively, events 1015, 1017, 1019, and 1023, along with block 1021 are referred to as step S1 1025.

Source access node 1007 sends a measurement configuration to UE 1005 (event 1027). The measurement configuration may include configuration information for one or more BWPs or a BWP-specific reference signal, such as a BWP-specific SSB or CSI-RS, associated with one or more BWPs of target access node 1009, for example. Target access node 1009 transmits the BWP-specific reference signal (event 1029). UE 1005 receives the BWP-specific reference signal, and makes measurements in accordance with the BWP-specific reference signal. The measurements are referred to as step S2 measurements (Z). UE 1005 sends a measurement report to target access node 1007 (event 1031). The measurement report includes the step S2 measurements, for example. The measurement report may also include the step S1 measurements. Source access node 1007 makes a BWP-level mobility decision (block 1033). As an example, source access node 1007 makes a BWP-level handover decision. As another example, source access node 1007 scales the measurements (e.g., the S1 measurements or the S2 measurements) utilizing one or more BWP parameters. As yet another example, source access node 1007 makes a BWP-level handover decision and scales the measurements. Source access node 1007 initiates the BWP-level mobility decision (event 1035). As an example, source access node 1007 sends an RRCConnectionReconfiguration message to UE 1005. Collectively, events 1027, 1029, 1031, and 1035, along with block 1033 are referred to as step S2 1037.

UE 1005 sends a measurement report including refined step S1 and step S2 measurements (event 1039). Source access node 1007 harmonizes step S3 and step S1 mobility (block 1041). Harmonizing the step S3 and step S1 mobility may help to prevent ping ponging of UE 1005 between cells, for example. As an example, harmonizing the step S3 mobility involves repeating, sequentially or selectively combining, iterating, or recursive operating of steps S1 and S2 to determine step S1 and step S3 mobility with equivalent cells. Source access node 1007 initiates the harmonized step S1 and S3 mobility (event 1043). As an example, source access node 1007 initiates the harmonized step S1 and S3 mobility by sending an RRCConnectionReconfiguration message to UE 1005. Collectively, events 1039 and 1043, along with block 1041 are referred to as step S3 1045. The mobility process continues with source access node 1007 sending a mobility message to target access node 1009 (event 1047). As an example, the mobility message is a handover request message. Other mobility messages are possible.

Figure 11A:
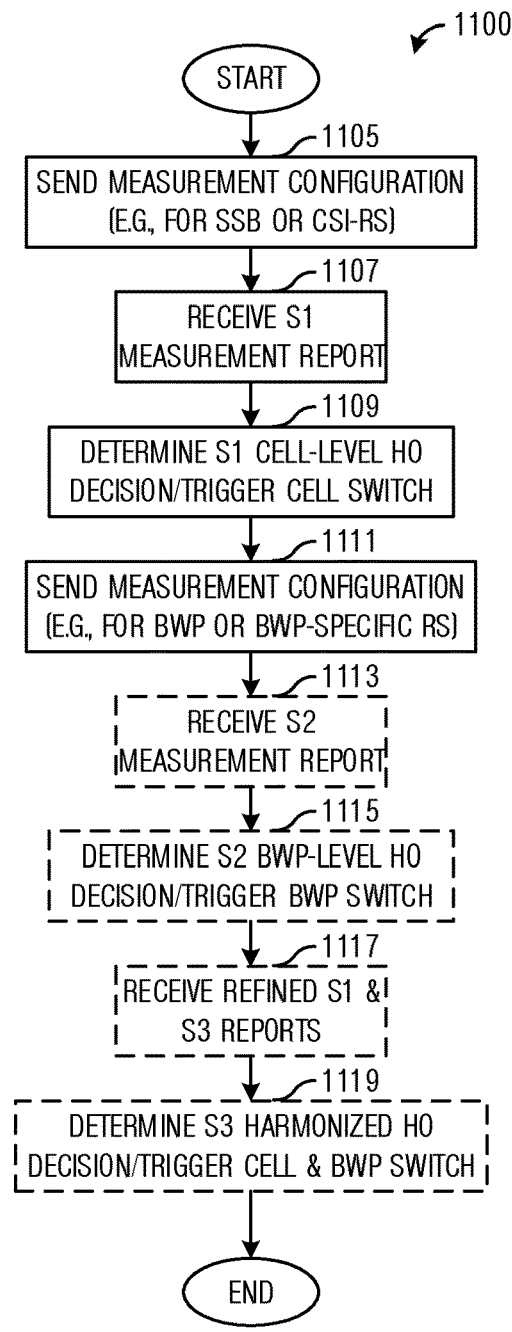

FIG. 11A illustrate a flow diagram of example operations 1100 occurring in a source access node performing UE-based measurements and network-based mobility. Operations 1100 may be indicative of operations occurring in a source access node as the source access node performs measurement configurations and mobility control. As shown in FIG. 11A, the source access node makes the mobility decisions based on measurement reports from a UE.

Operations 1100 begin with the source access node sending a measurement configuration to the UE (block 1105). The measurement configuration may include configuration information for a cell-specific reference signal, such as a SSB or CSI-RS, associated with a target access node, for example. The source access node receives a measurement report (block 1107). The measurement report may include, amongst other things, step S1 measurements (W). The source access node determines a cell-level mobility decision (block 1109). As an example, the source access node makes a cell-level handover decision. The source access node initiates the cell-level mobility decision. As an example, the source access node sends an RRCConnectionReconfiguration message to the UE.

The source access node sends a measurement configuration to the UE (block 1111). The measurement configuration may include configuration information for one or more BWPs or a BWP-specific reference signal, such as a BWP-specific SSB or CSI-RS, associated with one or more BWPs of target access nodes, for example. The source access node receives a measurement report (block 1113). The measurement report may include, amongst other things, step S2 measurements (Z). The source access node determines a BWP-level mobility decision (block 1115). As another example, the source access node scales the measurements (e.g., the S1 measurements or the S2 measurements) utilizing one or more BWP parameters. As yet another example, the source access node makes a BWP-level handover decision and scales the measurements. The source access node initiates the BWP-level mobility based on the decision. As an example, the source access node sends an RRCConnectionReconfiguration message to the UE.

The source access node receives a measurement report (block 1117). The measurement report may include, amongst other things, refined step S1 and step S2 measurements. The source access node harmonizes step S3 and step S1 mobility decisions (block 1119). Harmonizing the step S3 and step S1 mobility may help to prevent ping ponging of the UE between cells, for example. As an example, harmonizing the step S3 mobility involves repeating, combining, iterating, or recursive operating of steps S1 and S2 to determine step S1 and step S3 mobility with equivalent cells. The source access node initiates the harmonized step S1 and S3 mobility. As an example, the source access node initiates the harmonized step S1 and S3 mobility by sending an RRCConnectionReconfiguration message to the UE.

Figure 11B:
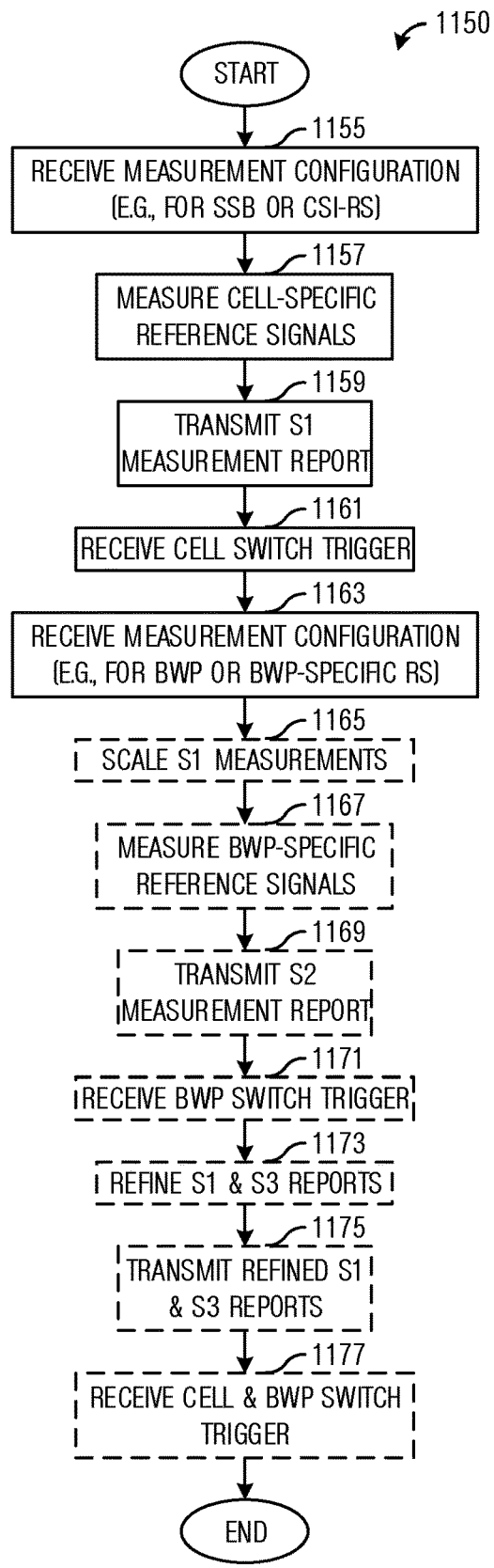

FIG. 11B illustrate a flow diagram of example operations 1150 occurring in a UE performing measurements and mobility. Operations 1150 may be indicative of operations occurring in a UE as the UE performs measurements and mobility. As shown in FIG. 1B, the UE makes measurement reports, which are used by a source access node to make mobility decisions.

Operations 1150 begin with the UE receiving a measurement configuration from a source access node (block 1155). The measurement configuration may include configuration information for a cell-specific reference signal, such as a SSB or CSI-RS, associated with a target access node, for example. The UE receives and measures cell-specific reference signals (block 1157). The UE transmits a measurement report to the source access node (block 1159). The measurement report may include, amongst other things, step S1 measurements (W). The UE receives a cell-level mobility trigger (block 1161). As an example, the UE receives an RRCConnectionReconfiguration message from the source access node.

The UE receives a measurement configuration from a source access node (block 1163). The measurement configuration may include configuration information for one or more BWPs or a BWP-specific reference signal, such as a BWP-specific SSB or CSI-RS, associated with one or more BWPs of target access nodes, for example. The UE scales the step S1 measurements (block 1165). The UE scales the step S1 measurements using one or more BWP parameters, for example. The UE receives and measures BWP-specific reference signals (block 1167). The UE transmits a measurement report to the source access node (block 1169). The measurement report may include, amongst other things, step S2 measurements (Z). The UE receives a BWP-level mobility trigger (block 1171). As an example, the UE receives an RRCConnectionReconfiguration message from the source access node.

The UE refines the step S1 and step S2 measurements (block 1173). The UE transmits a measurement report to the source access node (block 1175). The measurement report may include, amongst other things, the refined step S1 and step S2 measurements. The UE receives a mobility trigger (block 1177). As an example, the UE receives an RRCConnectionReconfiguration message from the source access node.

It is noted that FIGS. 8, 9A-9C, 10, and 11A-1B illustrate different example embodiments of the hierarchical mobility and measurement scheme and that other example embodiments are possible. As an example, the logical execution order of each block in the diagrams may be swapped, merged, or split. Additionally, details of the scaling and the steps S1 and S2 result combination to derive the step S3 decision may also vary. Multiple embodiments to refine the step S1 decision in FIGS. 9A-9C are possible, e.g., the step S1 selection may be corrected as the cell where step S3 prefers (where S3's BWP locates).

If the BWPs refer to a whole carrier of a cell (by its operating BW, for example), then the example embodiments reduce to legacy cell-based operation. If it is for an intra-cell BWP operation (e.g., target serving BWP selection, reselection, or switching), then the example embodiments remain applicable.

Any one of the example embodiments may work independently of one another, or any two may work together or may be merged. As an example, the first example embodiment may have BWP-level measurement (and decision) refinement based on cell-level measurements, but such a two-level hierarchical refinement scheme is not a necessity, because BWP-level measurements can be performed directly based on BWP-level RSs. Any other applicable embodiment following the same two-level hierarchical scheme may also work. As another example, the second example embodiment considers only RSRP scaling by BWP's BW (or number of RBs) for a specific case (e.g., intra-frequency same-carrier or same-numerology), e.g., to select a same RSRP but greater bandwidth BWP or cell, but several alternatives are possible, including:

the hierarchical scheme as described in the sub-proposal 2 may be revised to also be applicable to a same-band inter-carrier scenario, as long as channel characteristics of comparison BWP's (in same or different carriers) remain similar and are comparable to each other.

the scaling of the RSRP as described in the sub-proposal 1 can be similarly performed, by number of RBs or applied to RSRQ thresholds. The scaled RSRP can be combined with other metrics (e.g., RSRQ, RSRP without scaling, RSSI, and so forth) to derive refined BWP-level mobility criterion.

for idle or inactive state, follow the inter-frequency or IRAT absolute-priority based "R" criterion and scale the BW-relevant measurement metric or threshold before applying it for BWP-level cell (re)selection or handover (HO). The "cell" ranking in traditional "R" criterion would become "BWP" ranking in the example embodiments and would derive "BWP" reselection (rather than cell reselection).

In a scenario when the associated RS with the BWP are assumed as being present (or existing), as used in step S2 of FIGS. 9A-9C, but is actually not available to enable accurate measurement by sub-proposal 1 or 2, then a "cell-defining" RS, such as CD-SSB, may be used instead for the two comparison (i.e., source and target) BWPs, which essentially reduces the sub-proposal 1 to non-scaling or sub-proposal 2 to one-level (cell-level only) as the original mobility scheme, "R" or "S" criterion (because the scaling parameter remains the same for both BWP's).

It is noted that if neither BWP configuration nor BWP-specific RS exists, step S2 reduces to a null step, and steps S1 and S3 derive the same decision, thereby reducing to legacy cell-level mobility.

The example embodiments, such as BWP-scaled channel measurement metrics and BWP- or Cell-level hierarchically determined mobility, cover different mobility scenarios, (e.g., at BWP-level, cell-level or carrier-level), and for both RRC_Connected state handover or RRM, and RRC_Idle or RRC_Inactive state cell (re)selection. It covers serving cells, network-configured or statically pre-configured, or UE-detected neighboring cells, or BWPs on a high- or low-frequency carriers, or BWPs of narrow or wide bandwidth. It works for mobility among FDD and TDD, intra-RAT or IRAT systems, intra-frequency or inter-frequency systems, or inter-systems. It works for a standalone (SA) BWP (e.g., on a standalone Component Carrier with SSB) or a non-standalone (NSA) BWP (e.g., on a NSA or secondary CC possibly without a SSB), SA or NSA (DC, MC) NR systems, or multi-RAT NR systems. It works for BWPs or CCs scenarios with the same or different numerologies (e.g., inter-RAT). It works regardless of RRC_idle (cell selection, reselection), RRC_inactive, or RRC_connected states. The measurement at UE based on this scheme are more accurate than the (cell defining, fixed-BW) SSB based scheme, or more practical and of less overhead than the (wide-BW but active-BWP only) CSI-RS based. In general it is more scalable (regardless of BWP's BW or numerology), power efficient, or service friendly (requiring minimum changes to standards). The network can configure and signal BWPs in different manners, e.g., in Layer 2, explicitly in MSI, RSMI, or RRC connection configuration, or implicitly in MSI, RSMI, or MO and measurement report configuration (as in 3GPP TS 38.331, which is NOT a complete set of BWP parameters, or in Layer 1, by BWP-specific RSs, e.g., beyond the currently adopted cell-defining SSB for initial or default, or active and inactive BWP, or the CSI-RS for active BWPs. The scaling scheme derives normalized channel measurement metrics for mobility that enable more accurate and more fairly comparison among all neighboring cells or BWP's than BWP-agnostic measurements.

Figure 12:
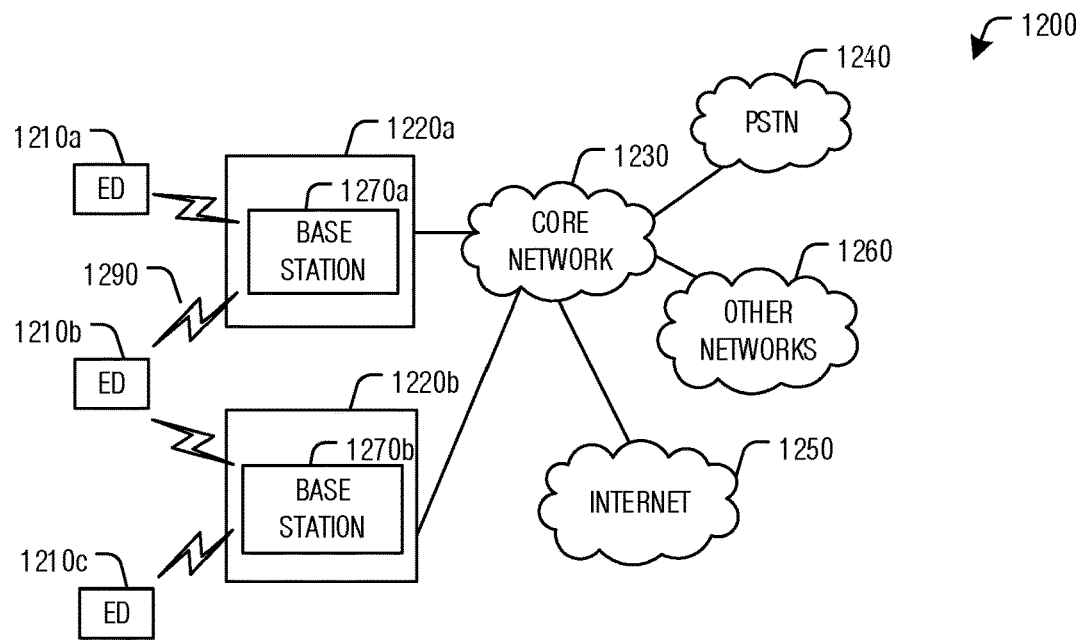
FIG. 12 illustrates an example communication system according to example embodiments described herein.

FIG. 12 illustrates an example communication system 1200. In general, the system 1200 enables multiple wireless or wired users to transmit and receive data and other content. The system 1200 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 1200 includes electronic devices (ED) 1210a-1210c, radio access networks (RANs) 1220a-1220b, a core network 1230, a public switched telephone network (PSTN) 1240, the Internet 1250, and other networks 1260. While certain numbers of these components or elements are shown in FIG. 12, any number of these components or elements may be included in the system 1200.

The EDs 1210a-1210c are configured to operate or communicate in the system 1200. For example, the EDs 1210a-1210c are configured to transmit or receive via wireless or wired communication channels. Each ED 1210a-1210c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 1220a-1220b here include base stations 1270a-1270b, respectively. Each base station 1270a-1270b is configured to wirelessly interface with one or more of the EDs 1210a-1210c to enable access to the core network 1230, the PSTN 1240, the Internet 1250, or the other networks 1260. For example, the base stations 1270a-1270b may include (or be) one or more of several well-known devices, such as a TRP, a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 1210a-1210c are configured to interface and communicate with the Internet 1250 and may access the core network 1230, the PSTN 1240, or the other networks 1260.

In the embodiment shown in FIG. 12, the base station 1270a forms part of the RAN 1220a, which may include other base stations, elements, or devices. Also, the base station 1270b forms part of the RAN 1220b, which may include other base stations, elements, or devices. Each base station 1270a-1270b operates to transmit or receive wireless signals within a particular geographic region or area, sometimes referred to as a "cell." In some embodiments, multiple-input multiple-output (MIMO) technology may be employed having multiple transceivers for each cell.

The base stations 1270a-1270b communicate with one or more of the EDs 1210a-1210c over one or more air interfaces 1290 using wireless communication links. The air interfaces 1290 may utilize any suitable radio access technology.

It is contemplated that the system 1200 may use multiple channel access functionality, including such schemes as described above. In particular embodiments, the base stations and EDs implement 5G New Radio (NR), LTE, LTE-A, LTE-AP, etc. Of course, other multiple access schemes and wireless protocols may be utilized.

The RANs 1220a-1220b are in communication with the core network 1230 to provide the EDs 1210a-1210c with voice, data, application, Voice over Internet Protocol (VoIP), or other services. Understandably, the RANs 1220a-1220b or the core network 1230 may be in direct or indirect communication with one or more other RANs (not shown). The core network 1230 may also serve as a gateway access for other networks (such as the PSTN 1240, the Internet 1250, and the other networks 1260). In addition, some or all of the EDs 1210a-1210c may include functionality for communicating with different wireless networks over different wireless links using different wireless technologies or protocols. Instead of wireless communication (or in addition thereto), the EDs may communicate via wired communication channels to a service provider or switch (not shown), and to the Internet 1250.

Although FIG. 12 illustrates one example of a communication system, various changes may be made to FIG. 12. For example, the communication system 1200 could include any number of EDs, base stations, networks, or other components in any suitable configuration.

Figure 13A:
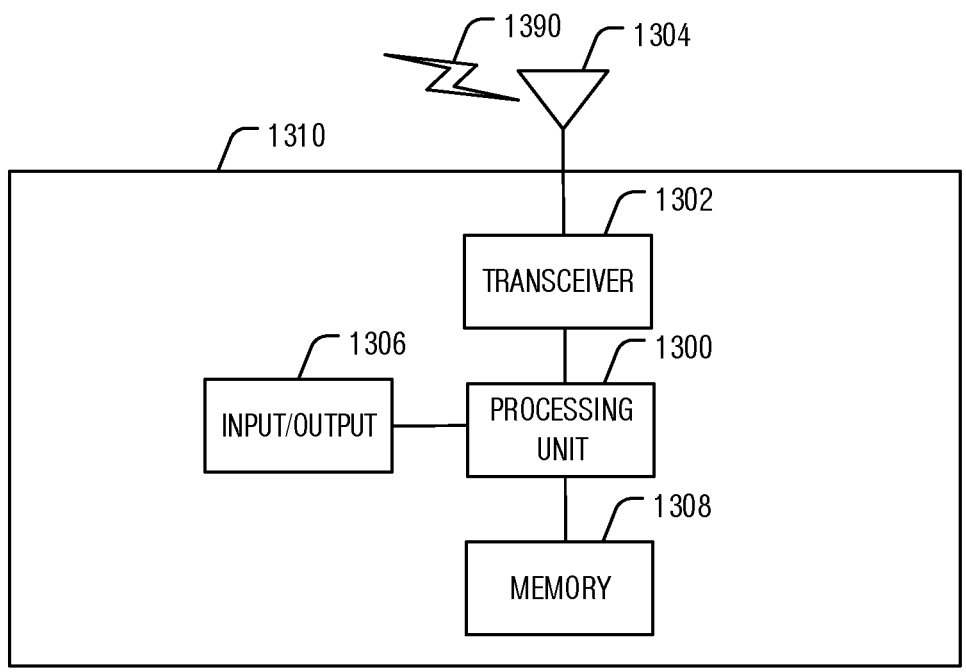
FIGS. 13A and 13B illustrate example devices that may implement the methods and teachings according to this disclosure.
Figure 13B:
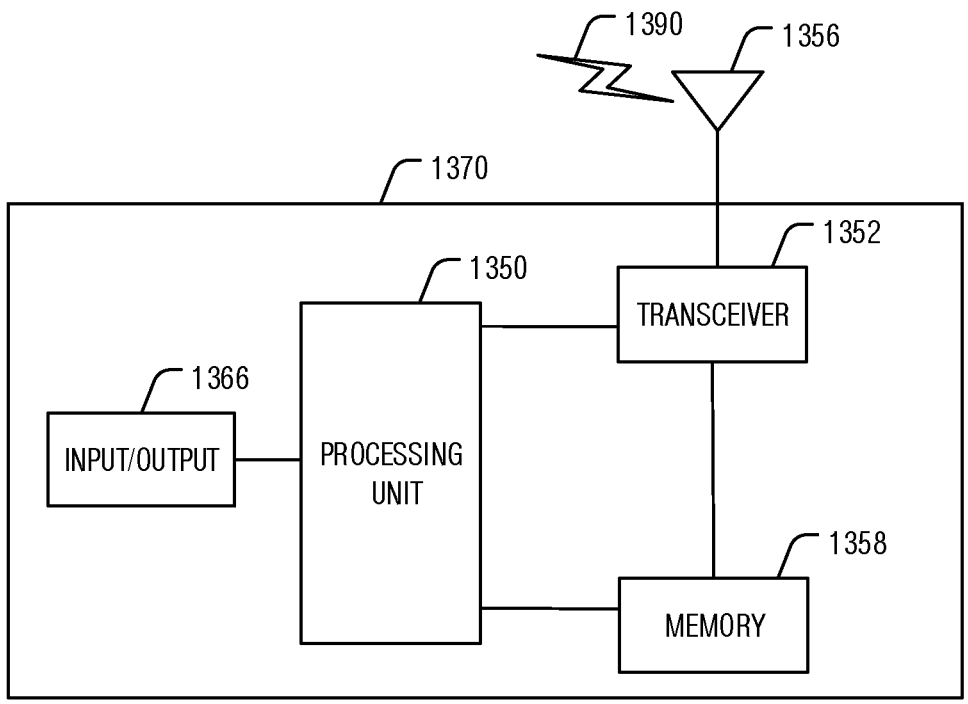

FIGS. 13A and 13B illustrate example devices that may implement the methods and teachings according to this disclosure. In particular, FIG. 13A illustrates an example ED 1310, and FIG. 13B illustrates an example base station 1370. These components could be used in the system 1200 or in any other suitable system.

As shown in FIG. 13A, the ED 1310 includes at least one processing unit 1300. The processing unit 1300 implements various processing operations of the ED 1310. For example, the processing unit 1300 could perform signal coding, data processing, power control, input/output processing, or any other functionality enabling the ED 1310 to operate in the system 1200. The processing unit 1300 also supports the methods and teachings described in more detail above. Each processing unit 1300 includes any suitable processing or computing device configured to perform one or more operations. Each processing unit 1300 could, for example, include a microprocessor, microcontroller, digital signal processor, field programmable gate array, or application specific integrated circuit.

The ED 1310 also includes at least one transceiver 1302. The transceiver 1302 is configured to modulate data or other content for transmission by at least one antenna or NIC (Network Interface Controller) 1304. The transceiver 1302 is also configured to demodulate data or other content received by the at least one antenna 1304. Each transceiver 1302 includes any suitable structure for generating signals for wireless or wired transmission or processing signals received wirelessly or by wire. Each antenna 1304 includes any suitable structure for transmitting or receiving wireless or wired signals. One or multiple transceivers 1302 could be used in the ED 1310, and one or multiple antennas 1304 could be used in the ED 1310. Although shown as a single functional unit, a transceiver 1302 could also be implemented using at least one transmitter and at least one separate receiver.

The ED 1310 further includes one or more input/output devices 1306 or interfaces (such as a wired interface to the Internet 1250). The input/output devices 1306 facilitate interaction with a user or other devices (network communications) in the network. Each input/output device 1306 includes any suitable structure for providing information to or receiving information from a user, such as a speaker, microphone, keypad, keyboard, display, or touch screen, including network interface communications.

In addition, the ED 1310 includes at least one memory 1308. The memory 1308 stores instructions and data used, generated, or collected by the ED 1310. For example, the memory 1308 could store software or firmware instructions executed by the processing unit(s) 1300 and data used to reduce or eliminate interference in incoming signals. Each memory 1308 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 13B, the base station 1370 includes at least one processing unit 1350, at least one transceiver 1352, which includes functionality for a transmitter and a receiver, one or more antennas 1356, at least one memory 1358, and one or more input/output devices or interfaces 1366. A scheduler, which would be understood by one skilled in the art, is coupled to the processing unit 1350. The scheduler could be included within or operated separately from the base station 1370. The processing unit 1350 implements various processing operations of the base station 1370, such as signal coding, data processing, power control, input/output processing, or any other functionality. The processing unit 1350 can also support the methods and teachings described in more detail above. Each processing unit 1350 includes any suitable processing or computing device configured to perform one or more operations. Each processing unit 1350 could, for example, include a microprocessor, microcontroller, digital signal processor, field programmable gate array, or application specific integrated circuit.

Each transceiver 1352 includes any suitable structure for generating signals for wireless or wired transmission to one or more EDs or other devices. Each transceiver 1352 further includes any suitable structure for processing signals received wirelessly or by wire from one or more EDs or other devices. Although shown combined as a transceiver 1352, a transmitter and a receiver could be separate components. Each antenna 1356 includes any suitable structure for transmitting or receiving wireless or wired signals. While a common antenna 1356 is shown here as being coupled to the transceiver 1352, one or more antennas 1356 could be coupled to the transceiver(s) 1352, allowing separate antennas 1356 to be coupled to the transmitter and the receiver if equipped as separate components. Each memory 1358 includes any suitable volatile or non-volatile storage and retrieval device(s). Each input/output device 1366 facilitates interaction with a user or other devices (network communications) in the network. Each input/output device 1366 includes any suitable structure for providing information to or receiving/providing information from a user, including network interface communications.

Figure 14:
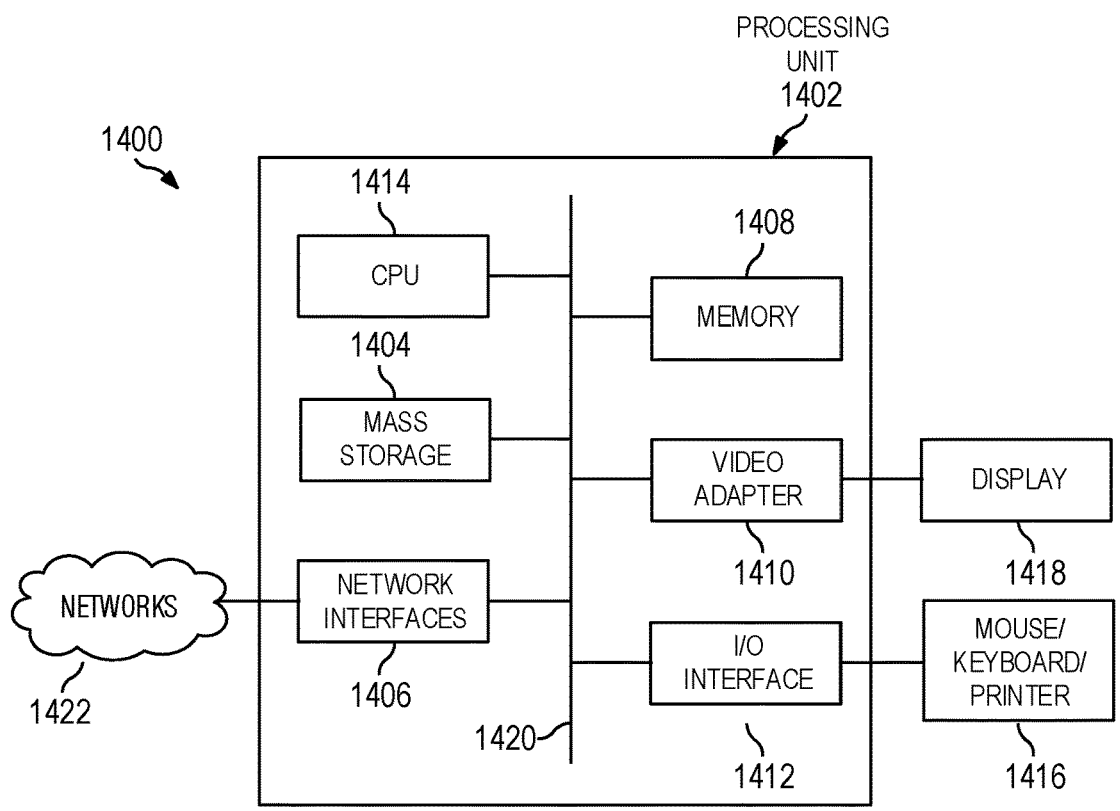
FIG. 14 is a block diagram of a computing system that may be used for implementing the devices and methods disclosed herein.

FIG. 14 is a block diagram of a computing system 1400 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1400 includes a processing unit 1402. The processing unit includes a central processing unit (CPU) 1414, memory 1408, and may further include a mass storage device 1404, a video adapter 1410, and an I/O interface 1412 connected to a bus 1420.

The bus 1420 may be one or more of any type of several bus architectures including a memory bus or memory controller, a peripheral bus, or a video bus. The CPU 1414 may comprise any type of electronic data processor. The memory 1408 may comprise any type of non-transitory system memory such as static random access memory (SRAM), dynamic random access memory (DRAM), synchronous DRAM (SDRAM), read-only memory (ROM), or a combination thereof. In an embodiment, the memory 1408 may include ROM for use at boot-up, and DRAM for program and data storage for use while executing programs.

The mass storage 1404 may comprise any type of non-transitory storage device configured to store data, programs, and other information and to make the data, programs, and other information accessible via the bus 1420. The mass storage 1404 may comprise, for example, one or more of a solid state drive, hard disk drive, a magnetic disk drive, or an optical disk drive.

The video adapter 1410 and the I/O interface 1412 provide interfaces to couple external input and output devices to the processing unit 1402. As illustrated, examples of input and output devices include a display 1418 coupled to the video adapter 1410 and a mouse, keyboard, or printer 1416 coupled to the I/O interface 1412. Other devices may be coupled to the processing unit 1402, and additional or fewer interface cards may be utilized. For example, a serial interface such as Universal Serial Bus (USB) (not shown) may be used to provide an interface for an external device.

The processing unit 1402 also includes one or more network interfaces 1406, which may comprise wired links, such as an Ethernet cable, or wireless links to access nodes or different networks. The network interfaces 1406 allow the processing unit 1402 to communicate with remote units via the networks. For example, the network interfaces 1406 may provide wireless communication via one or more transmitters/transmit antennas and one or more receivers/receive antennas. In an embodiment, the processing unit 1402 is coupled to a local-area network 1422 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a measuring unit or module, a scaling unit or module, or a refining unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for mobility management implemented by a user equipment (UE), the method comprising:
   measuring, by the UE, a reference signal to obtain mobility measurements for a mobility procedure, the reference signal associated with a cell or a bandwidth part (BWP); and
   scaling, by the UE, the mobility measurements in accordance with at least one BWP parameter; and
   reporting, by the UE, at least one of the mobility measurements or the scaled mobility measurements.

2. The method of claim 1, further comprising:
   measuring, by the UE, a BWP-specific reference signal associated with the BWP to obtain BWP-specific mobility measurements in response to determining that the BWP-specific reference signal associated with the BWP is available;
   scaling, by the UE, the BWP-specific mobility measurements to obtain scaled BWP-specific mobility measurements; and
   reporting, by the UE, the BWP-specific mobility measurements.

3. The method of claim 1, wherein the mobility measurements comprise cell-specific mobility measurements and BWP-specific mobility measurements.

4. The method of claim 1, wherein the scaled mobility measurements comprise cell-specific mobility measurements and BWP-specific mobility measurements.

5. The method of claim 4, further comprising:
   combining, by the UE, scaled cell-level mobility measurements and BWP-level mobility measurements to obtain a combined measurement; and
   determining, by the UE, a harmonized mobility decision in accordance with the combined measurement.

6. The method of claim 1, further comprising:
   determining, by the UE, a cell-level mobility decision in accordance with the mobility measurements;
   refining, by the UE, the cell-level mobility decision in accordance with the scaled mobility measurements in response to determining that a BWP-specific reference signal associated with the BWP is available; and
   reporting, by the UE, the refined cell-level mobility decision.

7. The method of claim 1, further comprising:
measuring, by the UE, a BWP-specific reference signal to obtain BWP-level mobility measurements in response to determining that the BWP-specific reference signal is available; and
determining, by the UE, a BWP-level mobility decision in accordance with the BWP-level mobility measurements.

8. The method of claim 7, further comprising:
scaling, by the UE, the BWP-level mobility measurements in accordance with parameters of a BWP configuration of the BWP in response to determining that the BWP configuration of the BWP is available;
determining, by the UE, a refined BWP-level mobility decision based on the scaled BWP-level mobility measurements; and
reporting, by the UE, at least one of the scaled BWP-level mobility measurements or the refined BWP-level mobility decision.

9. The method of claim 7, further comprising:
determining, by the UE, a refined cell-level mobility decision in accordance with at least one of a scaled cell-specific mobility measurement in response to determining that a BWP configuration of the BWP is available, the BWP-level mobility decision, or the BWP-level mobility measurements, and
performing, by the UE, a cell-level mobility process based on the refined cell-level mobility decision.

10. The method of claim 1, wherein the at least one BWP parameter includes a bandwidth (BW) of the BWP.

11. The method of claim 1, wherein the at least one BWP parameter includes a subcarrier spacing (SCS) of the BWP.

12. The method of claim 1, wherein the at least one BWP parameter includes a cyclic prefix (CP) of the BWP.

13. The method of claim 1, wherein the at least one BWP parameter includes a BW of the cell.

14. The method of claim 1, wherein the at least one BWP parameter includes a bandwidth of a carrier.

15. The method of claim 1, wherein the at least one BWP parameter includes a central frequency of the BWP, the cell, or a carrier.

16. A user equipment (UE) comprising:
a processor; and
a non-transitory computer readable storage medium storing programming for execution by the processor, the programming including instructions to:
measure a reference signal to obtain mobility measurements for a mobility procedure, the reference signal associated with a cell or a bandwidth part (BWP); and
scale the mobility measurements in accordance with at least one BWP parameter; and
report at least one of the mobility measurements or the scaled mobility measurements.

17. The UE of claim 16, the programming further including instructions to:
measure a BWP-specific reference signal associated with the BWP to obtain BWP-specific mobility measurements in response to determining that the BWP-specific reference signal associated with the BWP is available;
scale the BWP-specific mobility measurements to obtain scaled BWP-specific mobility measurements; and
report the BWP-specific mobility measurements.

18. The UE of claim 16, wherein the mobility measurements comprise cell-specific mobility measurements and BWP-specific mobility measurements.

19. The UE of claim 16, wherein the scaled mobility measurements comprise cell-specific mobility measurements and BWP-specific mobility measurements.

20. The UE of claim 19, the programming further including instructions to:
combine scaled cell-level mobility measurements and MVP-level mobility measurements to obtain a combined measurement; and
determine a harmonized mobility decision in accordance with the combined measurement.

* * * * *